US012586358B2

(12) United States Patent　　(10) Patent No.: US 12,586,358 B2
Fan　　(45) Date of Patent: Mar. 24, 2026

(54) OBJECT RECOGNITION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Peng Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 276 days.

(21) Appl. No.: 18/335,569

(22) Filed: Jun. 15, 2023

(65) Prior Publication Data

US 2023/0326185 A1 Oct. 12, 2023

Related U.S. Application Data

(63) Continuation of application No. PCT/CN2022/113686, filed on Aug. 19, 2022.

(30) Foreign Application Priority Data

Sep. 30, 2021 (CN) .......................... 202111161862.9

(51) Int. Cl.
*G06V 10/774* (2022.01)
*G06V 10/40* (2022.01)
(Continued)

(52) U.S. Cl.
CPC ............ *G06V 10/774* (2022.01); *G06V 10/40* (2022.01); *G06V 10/762* (2022.01); *G06V 10/764* (2022.01); *G06V 10/806* (2022.01)

(58) Field of Classification Search
CPC .. G06V 10/774; G06V 10/806; G06V 10/762; G06V 10/40; G06V 10/764
See application file for complete search history.

(56) References Cited

U.S. PATENT DOCUMENTS

2014/0140583 A1 5/2014 Yano et al.
2015/0161474 A1* 6/2015 Jaber ....................... G06F 18/23
382/203
(Continued)

FOREIGN PATENT DOCUMENTS

CN 110335248 A 10/2019
CN 110968802 A 4/2020
(Continued)

OTHER PUBLICATIONS

The World Intellectual Property Organization (WIPO) International Search Report for PCT/CN2022/113686 Nov. 18, 2022 11 Pages (including translation).
(Continued)

*Primary Examiner* — David F Dunphy
(74) *Attorney, Agent, or Firm* — Anova Law Group, PLLC

(57) ABSTRACT

An object recognition method includes: obtaining a candidate object set having a plurality of candidate objects; obtaining a plurality of pieces of candidate object information of the candidate objects on a plurality of dimensions, performing feature extraction on the candidate object information to obtain candidate object features, fusing the candidate object features to obtain object extraction features corresponding to the candidate objects, and performing object category probability recognition based on the object extraction features to obtain a recognition probability that the candidate objects belong to a target object category; clustering the object extraction features to obtain sub extraction feature sets corresponding to clustering categories, and forming one sub object set from candidate objects corresponding to the object extraction features; and obtaining representative objects by selecting from the sub object sets (Continued)

respectively based on recognition probabilities corresponding to the candidate objects in the sub object sets.

20 Claims, 10 Drawing Sheets

(51) Int. Cl.
    *G06V 10/762*        (2022.01)
    *G06V 10/764*        (2022.01)
    *G06V 10/80*         (2022.01)

(56)                References Cited

U.S. PATENT DOCUMENTS

2020/0272915 A1 *   8/2020   Tata ........................ G06F 16/35
2022/0215032 A1     7/2022   Li

FOREIGN PATENT DOCUMENTS

CN       111291266 A     6/2020
CN       111368926 A     7/2020

OTHER PUBLICATIONS

China National Intellectual Property Administration (CNIPA) Office Action 1 for Application No. 202111161862.9 Dec. 24, 2025 9 Pages (including translation).

* cited by examiner

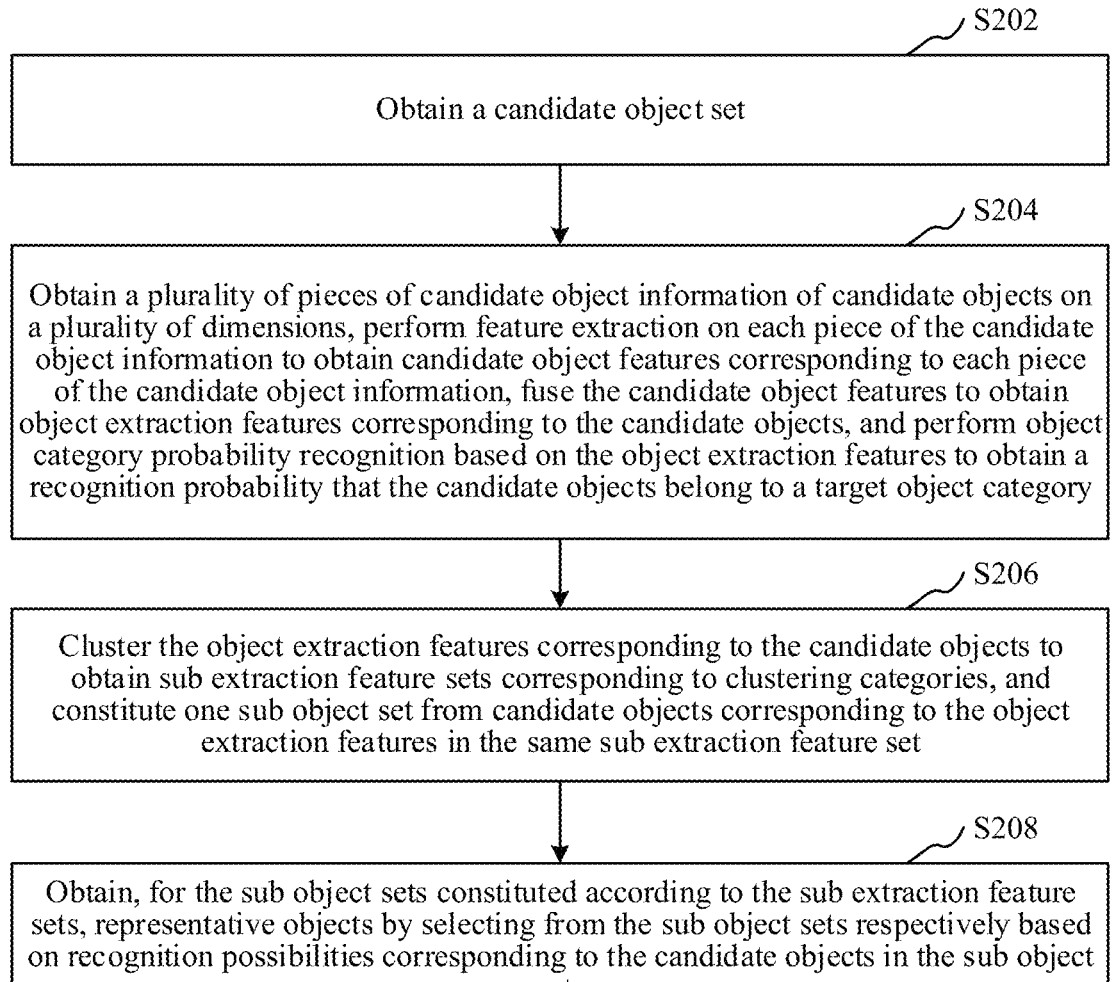

S202

Obtain a candidate object set

S204

Obtain a plurality of pieces of candidate object information of candidate objects on a plurality of dimensions, perform feature extraction on each piece of the candidate object information to obtain candidate object features corresponding to each piece of the candidate object information, fuse the candidate object features to obtain object extraction features corresponding to the candidate objects, and perform object category probability recognition based on the object extraction features to obtain a recognition probability that the candidate objects belong to a target object category

S206

Cluster the object extraction features corresponding to the candidate objects to obtain sub extraction feature sets corresponding to clustering categories, and constitute one sub object set from candidate objects corresponding to the object extraction features in the same sub extraction feature set

S208

Obtain, for the sub object sets constituted according to the sub extraction feature sets, representative objects by selecting from the sub object sets respectively based on recognition possibilities corresponding to the candidate objects in the sub object sets

FIG. 2

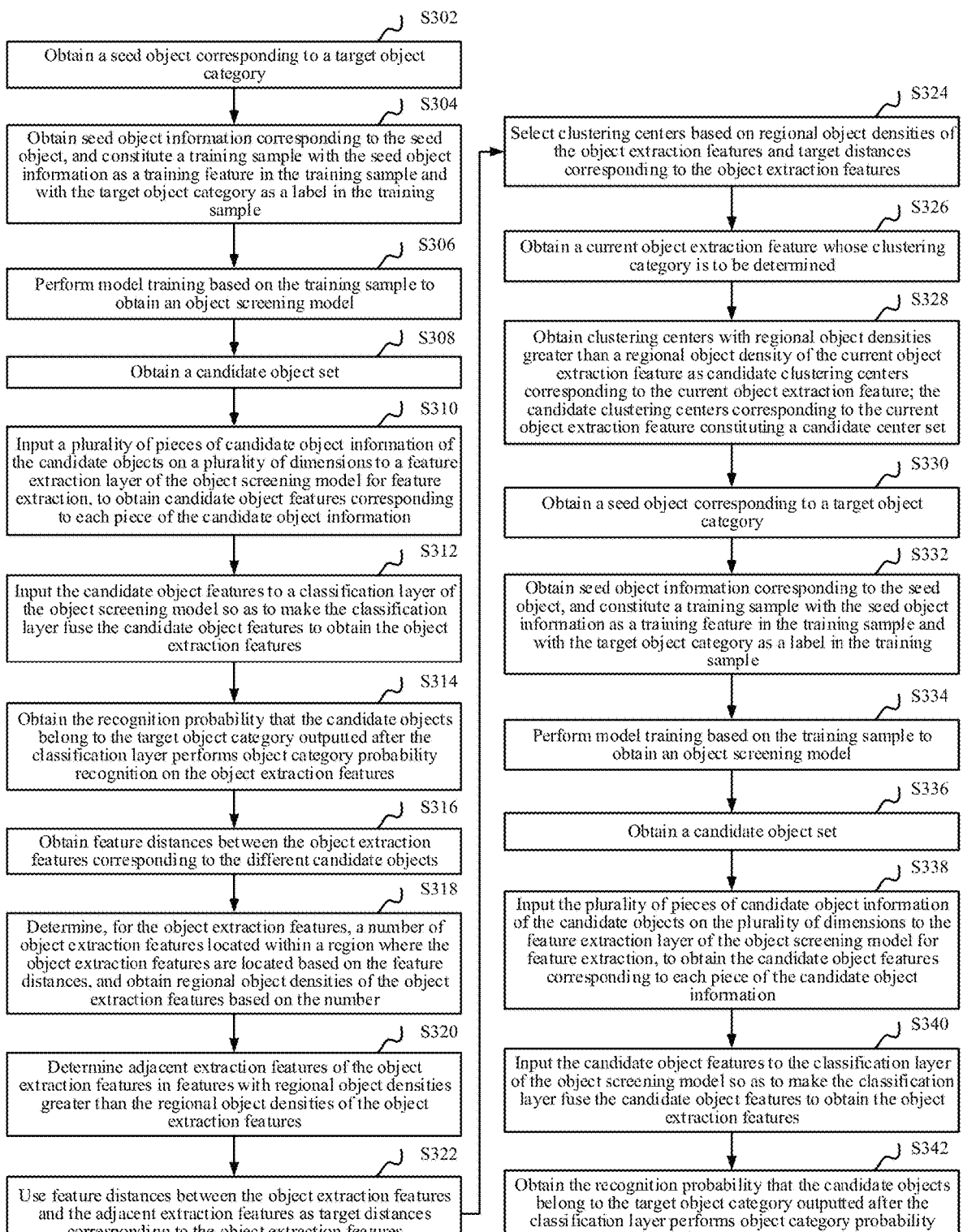

S302
Obtain a seed object corresponding to a target object category

S304
Obtain seed object information corresponding to the seed object, and constitute a training sample with the seed object information as a training feature in the training sample and with the target object category as a label in the training sample S306
Perform model training based on the training sample to obtain an object screening model S308
Obtain a candidate object set S310
Input a plurality of pieces of candidate object information of the candidate objects on a plurality of dimensions to a feature extraction layer of the object screening model for feature extraction, to obtain candidate object features corresponding to each piece of the candidate object information S312
Input the candidate object features to a classification layer of the object screening model so as to make the classification layer fuse the candidate object features to obtain the object extraction features S314
Obtain the recognition probability that the candidate objects belong to the target object category outputted after the classification layer performs object category probability recognition on the object extraction features S316
Obtain feature distances between the object extraction features corresponding to the different candidate objects S318
Determine, for the object extraction features, a number of object extraction features located within a region where the object extraction features are located based on the feature distances, and obtain regional object densities of the object extraction features based on the number S320
Determine adjacent extraction features of the object extraction features in features with regional object densities greater than the regional object densities of the object extraction features S322
Use feature distances between the object extraction features and the adjacent extraction features as target distances corresponding to the object extraction features S324
Select clustering centers based on regional object densities of the object extraction features and target distances corresponding to the object extraction features S326
Obtain a current object extraction feature whose clustering category is to be determined S328
Obtain clustering centers with regional object densities greater than a regional object density of the current object extraction feature as candidate clustering centers corresponding to the current object extraction feature; the candidate clustering centers corresponding to the current object extraction feature constituting a candidate center set S330
Obtain a seed object corresponding to a target object category S332
Obtain seed object information corresponding to the seed object, and constitute a training sample with the seed object information as a training feature in the training sample and with the target object category as a label in the training sample S334
Perform model training based on the training sample to obtain an object screening model S336
Obtain a candidate object set S338
Input the plurality of pieces of candidate object information of the candidate objects on the plurality of dimensions to the feature extraction layer of the object screening model for feature extraction, to obtain the candidate object features corresponding to each piece of the candidate object information S340
Input the candidate object features to the classification layer of the object screening model so as to make the classification layer fuse the candidate object features to obtain the object extraction features S342
Obtain the recognition probability that the candidate objects belong to the target object category outputted after the classification layer performs object category probability recognition on the object extraction features

FIG. 3

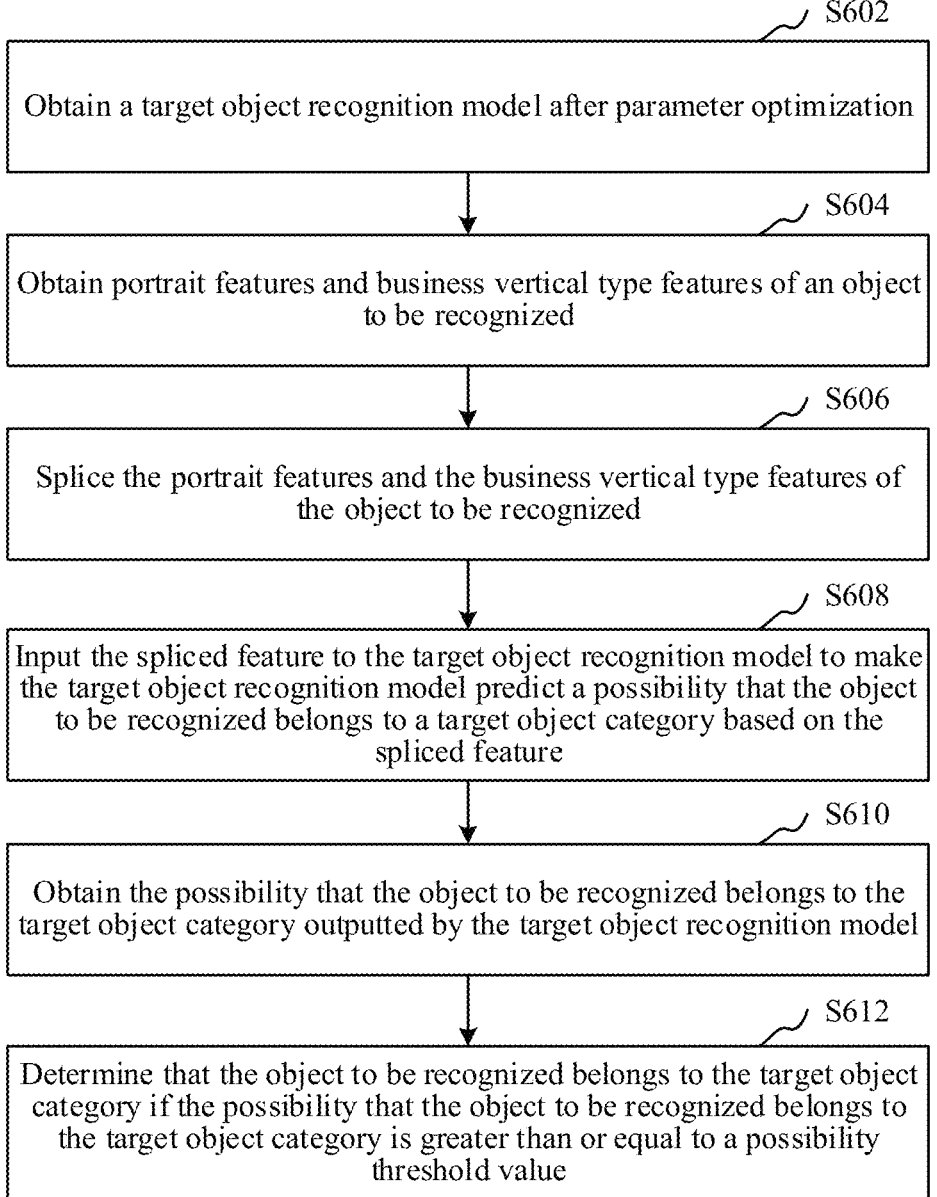

S602

Obtain a target object recognition model after parameter optimization

S604

Obtain portrait features and business vertical type features of an object to be recognized

S606

Splice the portrait features and the business vertical type features of the object to be recognized

S608

Input the spliced feature to the target object recognition model to make the target object recognition model predict a possibility that the object to be recognized belongs to a target object category based on the spliced feature

S610

Obtain the possibility that the object to be recognized belongs to the target object category outputted by the target object recognition model

S612

Determine that the object to be recognized belongs to the target object category if the possibility that the object to be recognized belongs to the target object category is greater than or equal to a possibility threshold value

FIG. 6

OBJECT RECOGNITION METHOD AND APPARATUS, DEVICE, AND STORAGE MEDIUM

RELATED APPLICATIONS

This application is a continuation application of PCT Patent Application No. PCT/CN2022/113686, filed on Aug. 19, 2022, which claims priority to Chinese Patent Application No. 202111161862.9, entitled "OBJECT RECOGNITION METHOD AND APPARATUS, DEVICE AND STORAGE MEDIUM" filed with the China Patent Office on Sep. 30, 2021, content of all of which is incorporated herein by reference in its entirety.

FIELD OF THE TECHNOLOGY

This disclosure relates to the field of computer technologies and, in particular, to an object recognition method and apparatus, a computer device, a storage medium and a program product.

BACKGROUND OF THE DISCLOSURE

In the era of artificial intelligence, it is one of current research hotspots to dig out valuable information from massive data through a manner of artificial intelligence to achieve effective transfer of information. For example, by digging information of different objects, an artificial intelligence model is constructed and trained by utilizing the dug information, the artificial intelligence model is used for predicting categories to which the objects belong, this prediction result may be applied to various scenarios, for instance, relevant push information may be generated for the objects based on this prediction result to achieve effective transfer of the information, and for another instance, network resources of corresponding shares may be allocated to the objects of different categories based on this prediction result, and so on.

The selection of training samples plays a significant role for training effects of the artificial intelligence model, and if the training samples are not selected properly or accurately, the model training effect will be affected, which results in subsequent low prediction accuracy of the model.

SUMMARY

One aspect of this disclosure provides an object recognition method. The method includes: obtaining a candidate object set having a plurality of candidate objects; obtaining a plurality of pieces of candidate object information of the candidate objects on a plurality of dimensions, performing feature extraction on each piece of the candidate object information to obtain candidate object features corresponding to each piece of the candidate object information, fusing the candidate object features to obtain object extraction features corresponding to the candidate objects, and performing object category probability recognition based on the object extraction features to obtain a recognition probability that the candidate objects belong to a target object category; clustering the object extraction features corresponding to the candidate objects to obtain sub extraction feature sets corresponding to clustering categories, and forming one sub object set from candidate objects corresponding to the object extraction features in the same sub extraction feature set; and obtaining, for the sub object sets formed according to the sub extraction feature sets, representative objects by selecting from the sub object sets respectively based on recognition probabilities corresponding to the candidate objects in the sub object sets.

Another aspect of this disclosure provides a computer device. The computer device includes a memory being configured to store computer-readable instructions, and at least one processor coupled to the memory configured to execute the computer-readable instructions to perform: obtaining a candidate object set having a plurality of candidate objects; obtaining a plurality of pieces of candidate object information of the candidate objects on a plurality of dimensions, performing feature extraction on each piece of the candidate object information to obtain candidate object features corresponding to each piece of the candidate object information, fusing the candidate object features to obtain object extraction features corresponding to the candidate objects, and performing object category probability recognition based on the object extraction features to obtain a recognition probability that the candidate objects belong to a target object category; clustering the object extraction features corresponding to the candidate objects to obtain sub extraction feature sets corresponding to clustering categories, and forming one sub object set from candidate objects corresponding to the object extraction features in the same sub extraction feature set; and obtaining, for the sub object sets formed according to the sub extraction feature sets, representative objects by selecting from the sub object sets respectively based on recognition probabilities corresponding to the candidate objects in the sub object sets.

Another aspect of this disclosure provides a non-transitory computer-readable storage medium. The non-transitory computer-readable storage medium stores computer-readable instructions executable by at least one processor to perform: obtaining a candidate object set having a plurality of candidate objects; obtaining a plurality of pieces of candidate object information of the candidate objects on a plurality of dimensions, performing feature extraction on each piece of the candidate object information to obtain candidate object features corresponding to each piece of the candidate object information, fusing the candidate object features to obtain object extraction features corresponding to the candidate objects, and performing object category probability recognition based on the object extraction features to obtain a recognition probability that the candidate objects belong to a target object category; clustering the object extraction features corresponding to the candidate objects to obtain sub extraction feature sets corresponding to clustering categories, and forming one sub object set from candidate objects corresponding to the object extraction features in the same sub extraction feature set; and obtaining, for the sub object sets formed according to the sub extraction feature sets, representative objects by selecting from the sub object sets respectively based on recognition probabilities corresponding to the candidate objects in the sub object sets.

BRIEF DESCRIPTION OF THE DRAWINGS

To illustrate the technical solutions in the present disclosure more clearly, the accompanying drawings for describing the embodiments are briefly introduced below. Apparently, the accompanying drawings only show some embodiments of the present disclosure, and a person of ordinary skill in the art may derive other drawings from these accompanying drawings without creative efforts.

FIG. 2 is a schematic flowchart of an object recognition method in another embodiment of this disclosure.

FIG. 3 is a schematic flowchart of an object recognition method in another embodiment of this disclosure.

FIG. 6 is a schematic flowchart of online processing of an object recognition method in an embodiment of this disclosure.

DESCRIPTION OF EMBODIMENTS

Figure 1A:
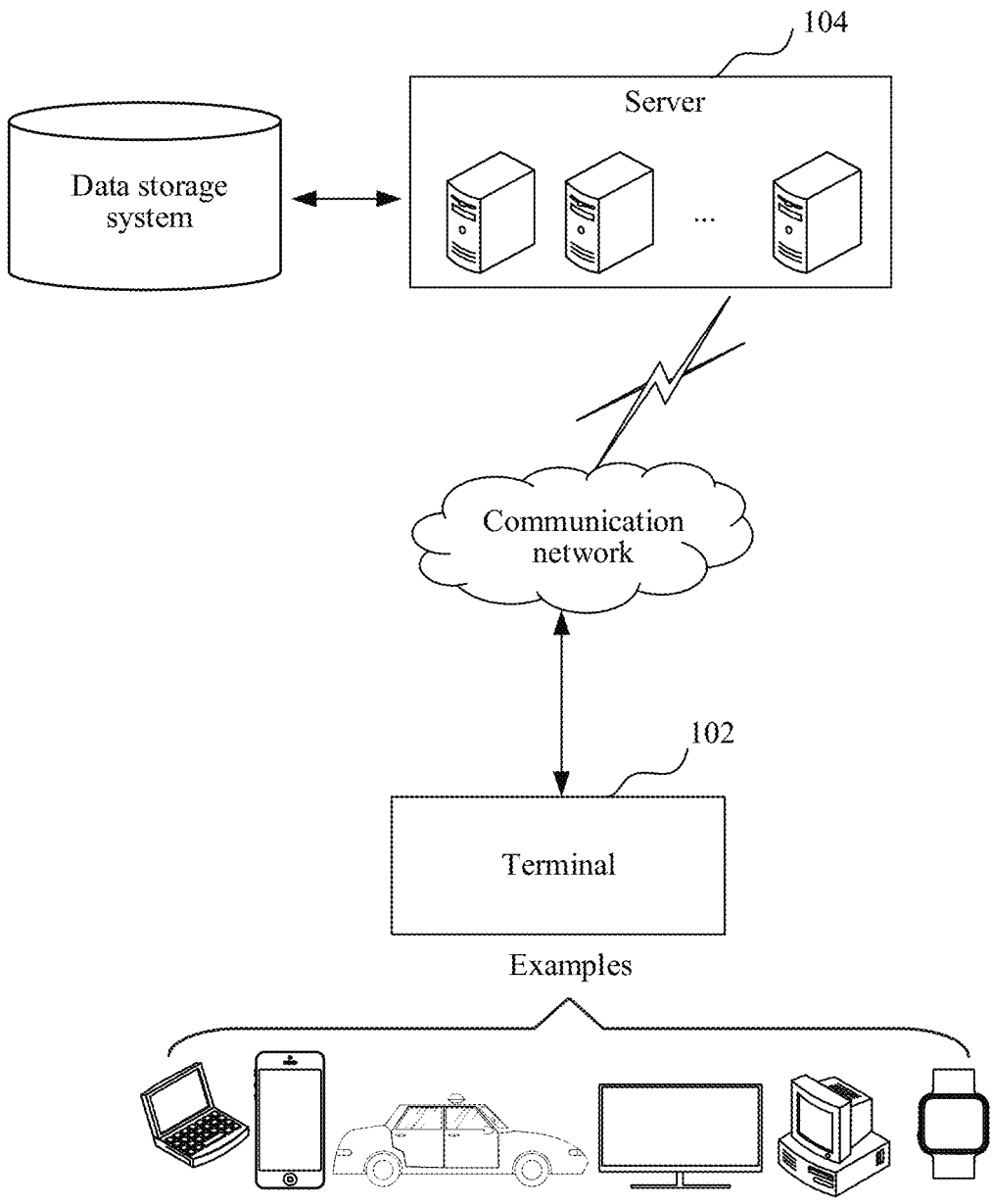
FIG. 1A is a diagram of an application environment of an object recognition method in an embodiment.

To make the objectives, technical solutions, and advantages of this disclosure clearer, the following further describes certain embodiments of this disclosure in detail with reference to the accompanying drawings. It is to be understood that the specific embodiments described herein are only used for explaining this disclosure, and are not used for limiting this disclosure.

The "embodiments" mentioned in this disclosure means that particular features, structures, or characteristics described with reference to the embodiments may be included in at least some embodiments of this disclosure. The phrase appearing in various positions in the specification does not necessarily refer to the same embodiment, nor is it an independent or alternative embodiment that is mutually exclusive with other embodiments. A person skilled in the art explicitly or implicitly understands that the embodiments described in this disclosure may be combined with other embodiments.

With the research and progress of the deep learning technology, it has been studied and applied in many fields, one of which is the grouping and classification of objects based on deep learning models. For example, whether to push content related to buying a house to an object is intelligently judged based on a prediction result of a deep learning model to a house property state of the object. For another example, whether to push content related to buying a car to an object is intelligently judged based on a prediction result of a deep learning model to a car buying state of the object. For yet another example, whether to push content related to renting a house to an object is intelligently judged based on a prediction result of a deep learning model to a house renting state of the object.

The house property state of the object refers to whether the object owns house property at present, namely, whether the object has bought a house. In the scenario of predicting the house property state of the object through the deep learning model, the larger a prediction probability outputted by the deep learning model, the larger the probability that the object owns house property, and at the moment, the content related to buying a house may not be pushed to the object; and the smaller the prediction probability outputted by the deep learning model, the smaller the probability that the object owns house property, and at the moment, the content related to buying a house may be pushed to the object.

The car buying state of the object refers to whether the object has owned a car at present, namely, whether the object has bought a car. In the scenario of predicting the car buying state of the object through the deep learning model, the larger a prediction probability outputted by the deep learning model, the larger the probability that the object owns a car, and at the moment, the content related to buying a car may not be pushed to the object; and the smaller the prediction probability outputted by the deep learning model, the smaller the probability that the object owns a car, and at the moment, the content related to buying a car may be pushed to the object.

The house renting state of the object refers to whether the object has rented a house at present. In the scenario of predicting the house renting state of the object through the deep learning model, the larger a prediction probability outputted by the deep learning model, the larger the probability that the object has rented a house, and at the moment, the content related to renting a house may not be pushed to the object; and the smaller the prediction probability outputted by the deep learning model, the smaller the probability that the object has rented a house, and at the moment, the content related to renting a house may be pushed to the object.

A solution provided by an embodiment of this disclosure relates to a deep learning technology of artificial intelligence, and may be applied to scenarios such as a cloud technology, cloud security, artificial intelligence and smart transport. Object information (including but not limited to object device information, object behavior information, etc.) and data (including but not limited to data for showing, data for analysis, etc.) involved in this disclosure are information and data that are authorized by objects or adequately authorized by all parties. Correspondingly, this disclosure further provides corresponding object authorization entries, for objects to select authorization or rejection.

An object recognition method provided by this disclosure may be executed by a local computing device/local computing system, and may also be executed by a distributed computing system. The distributed computing system is, for example, a server cluster composed of a plurality of physical servers or a system composed of terminal devices and servers.

FIG. 1A is a diagram of an application environment of an object recognition method in an embodiment of this disclosure. A terminal 102 communicates with a server 104 through a communication network. The terminal 102 may interact with the server 104 through the communication network. The terminal 102 may be but is not limited to various desktop computers, laptops, smart phones, tablets, Internet of Things devices, and portable wearable devices. The Internet of Things devices may be smart speakers, smart TVs, smart air conditioners, smart car devices, etc. The portable wearable devices may be smart watches, smart bracelets, head-mounted devices, etc. The server 104 may be implemented by using an independent server or a server cluster composed of a plurality of servers or a cloud server.

The server 104 may store data involved by the object recognition method through a data storage system, and the data storage system may be integrated in the server 104 or disposed separated from the server 104.

The object recognition method provided by this disclosure may be performed by the terminal 102 and the server 104 in a cooperated manner, or be independently performed by the terminal 102, or be independently performed by the server 104. Taking as an example, when the method is independently performed by the server 104, the server 104 may obtain a candidate object set. The candidate object set includes a plurality of candidate objects, and the server 104 obtains a plurality of pieces of candidate object information of the candidate objects on a plurality of dimensions, performs feature extraction on each piece of the candidate object information to obtain candidate object features corresponding to each piece of the candidate object information, fuses the candidate object features to obtain object extraction features corresponding to the candidate objects, and performs object category probability recognition based on the object extraction features to obtain a recognition probability that the candidate objects belong to a target object category. Further, the server 104 clusters the object extraction features corresponding to the candidate objects to obtain sub extraction feature sets corresponding to clustering categories, and constitutes one sub object set from candidate objects corresponding to the object extraction features in the same sub extraction feature set; and then the server 104 obtains, for the sub object sets constituted according to the sub extraction feature sets, representative objects by selecting from the sub object sets respectively based on recognition probabilities corresponding to the candidate objects in the sub object sets, candidate object information of the representative objects obtained by selection being used for training a target object recognition model, and the trained target object recognition model being configured to recognize whether objects belong to the target object category.

In the object recognition method provided by this disclosure, the so-called target object category may be categories under different application scenarios, for example, through the object recognition method, whether objects belong to an object category of a state of owning house property may be predicted, whether objects belong to an object category of owning cars may be further predicted, whether objects belong to an object category of a state of renting a house may be further predicted, precise prediction of whether objects own house property, whether objects own cars and whether objects rent houses is achieved, and thus objects having potential requirements for house property information, car buying information and house renting information are accurately determined, and relevant information is pushed to such objects, which cannot only improve the effectiveness of information transfer, but also avoid occupation and waste of computer resources and network resources caused by generating and pushing massive ineffective relevant information to mismatched objects, saving the computer resources and the network resources.

Figure 1B:
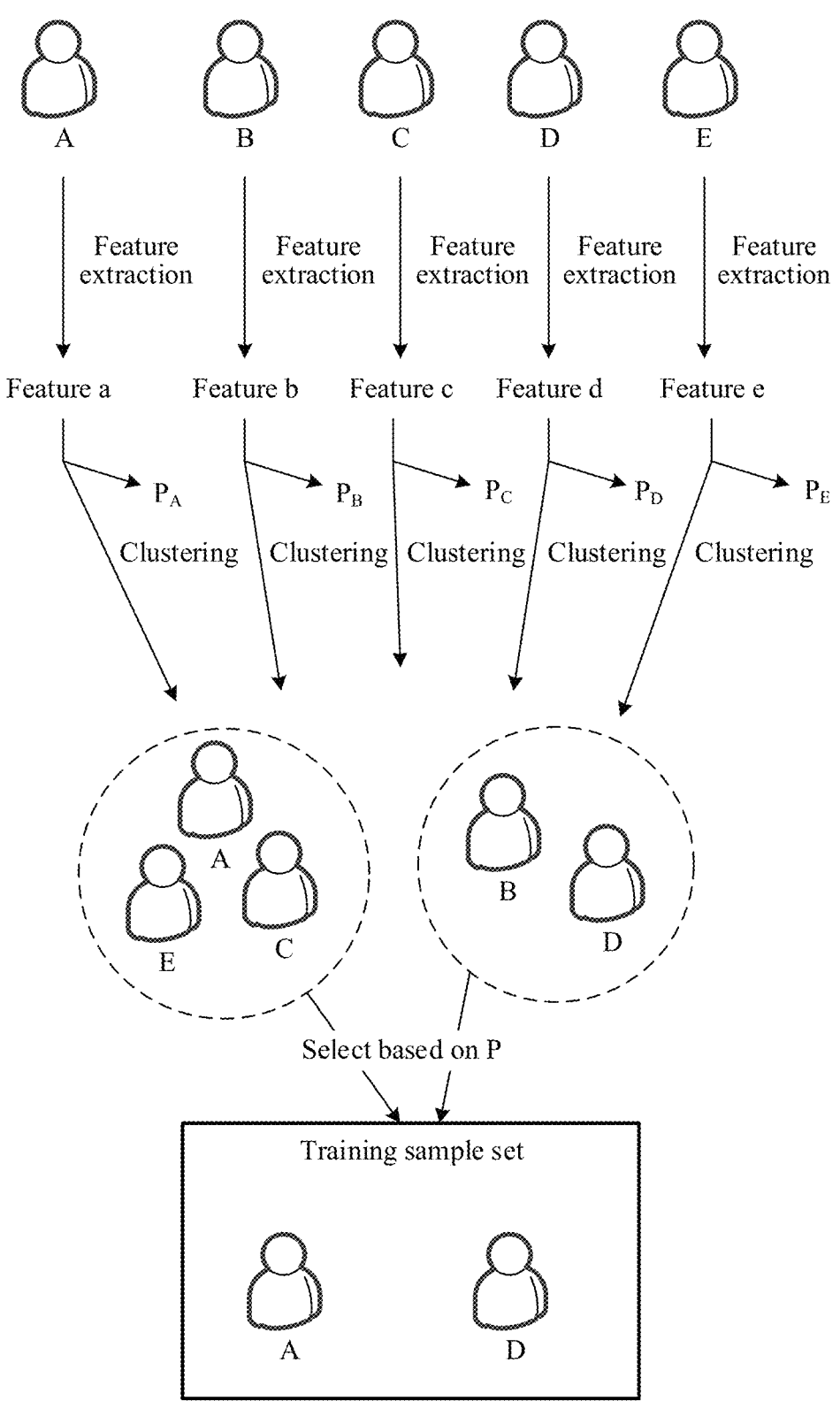
FIG. 1B is a schematic diagram of a processing process of an object recognition method in an embodiment of this disclosure.

As shown in FIG. 1B, the object recognition method provided by this disclosure mainly includes: performing feature extraction on a plurality of objects, for example, performing feature extraction on objects A, B, C, D and E, extracted features being called object extraction features, and then obtaining object extraction features of the objects, such as a feature a of the object A, a feature b of the object B, a feature c of the object C, a feature d of the object D and a feature e of the object E; and next, recognizing a probability that the objects belong to a target object category based on the object extraction features of the objects, the recognized probability being called a recognition probability, and then obtaining a recognition probability P that the objects belong to the target object category, such as a recognition probability that the object A belongs to the target object category being $P_A$, a recognition probability that the object B belongs to the target object category being $P_B$, a recognition probability that the object C belongs to the target object category being $P_C$, a recognition probability that the object D belongs to the target object category being $P_D$, and a recognition probability that the object E belongs to the target object category being $P_E$. The objects are clustered based on the object extraction features of the objects to obtain a plurality of object sets; and a corresponding representative object is selected from each object set respectively according to the recognition probability that the objects belong to the target object category, the representative objects are added into a training sample set, a target object recognition model is constructed by utilizing the training sample set, and whether the objects belong to the target object category is predicted by utilizing the target object recognition model.

In the above object recognition method, the object extraction features are obtained by performing feature extraction on the candidate object information, and since the candidate objects are clustered according to the object extraction features of the candidate objects, candidate objects belonging to the same category may be placed in the same sub object set. As the recognition probability that the candidate objects belong to the target object category is obtained according to the object extraction features of the candidate objects, the representative objects are obtained by selecting from the sub object sets respectively according to the recognition probability of the candidate objects, the representative objects having representativeness may be selected from the sub object sets belonging to the same category, the selected representative objects can cover the candidate objects of all categories and also have representative characteristics of each category, and thus the target object recognition model obtained by training using the candidate object information of the representative objects can dig out differences of the different categories as well as the representative characteristics of each category, so that the accuracy of predicting whether the objects belong to the target object category is improved. Under a scenario of information pushing, the effectiveness of transfer of pushed information can be improved, pushing massive relevant information to mismatched objects is avoided, and computer resources are saved.

Figure 1C:
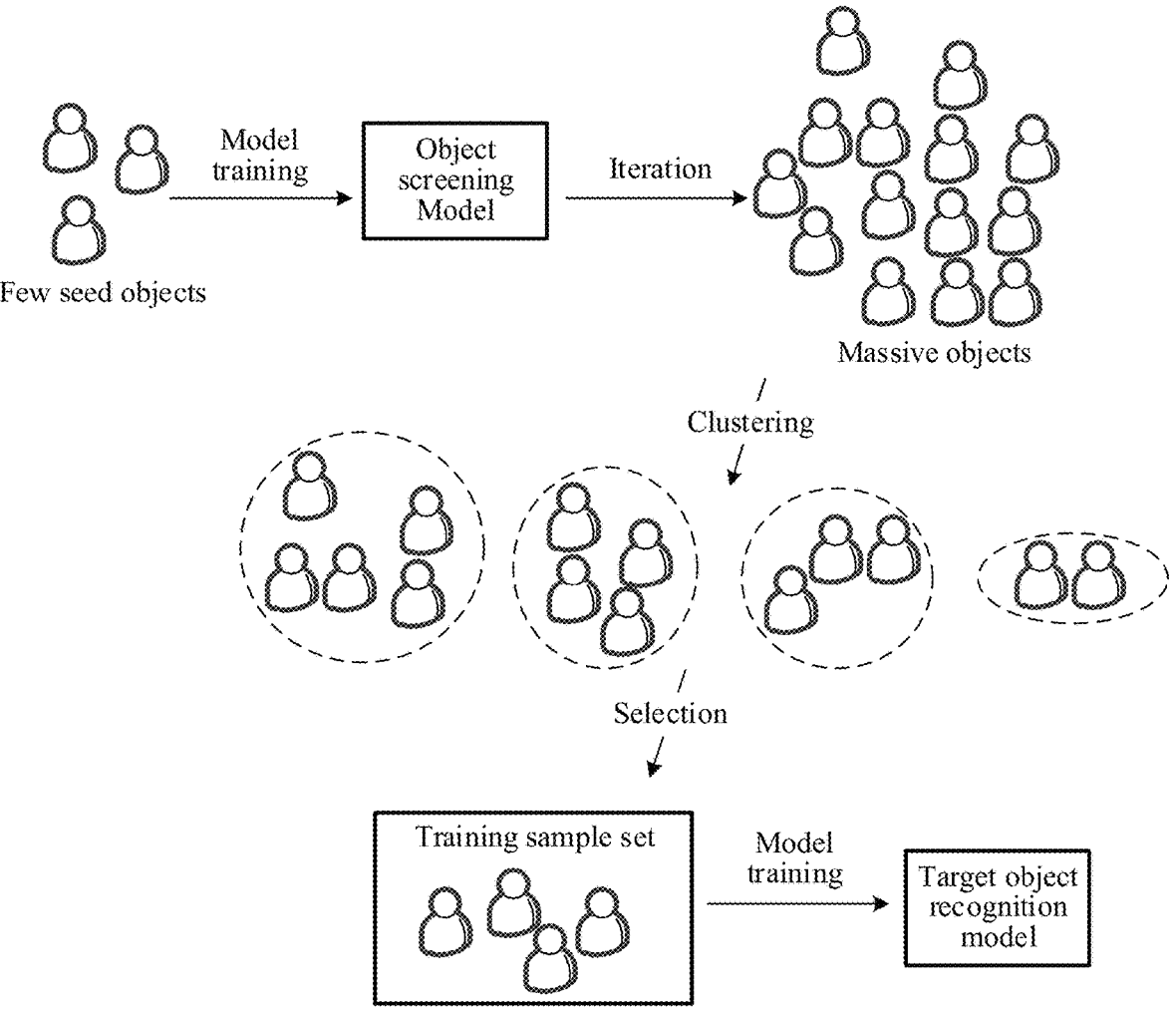
FIG. 1C is a schematic diagram of a processing process of an object recognition method in another embodiment of this disclosure.

This disclosure further provides an object recognition method. As shown in FIG. 1C, the method mainly includes: obtaining a small number of seed objects based on manual annotation and a business logic, constructing an object screening model on the basis of the a small number of seed objects, and performing multiple rounds of iterative processing on other objects through the object screening model to obtain object extraction features of massive objects and a recognition probability of belonging to a target object category; next, clustering the massive objects based on the object extraction features of the objects to obtain a plurality of object sets, selecting representative objects from the object sets according to the recognition probability that the objects belong to the target object category, and adding the representative objects into a training sample set; and performing model training by utilizing the training sample set to obtain a target object recognition model, and predicting whether the objects belong to the target object category by utilizing the target object recognition model.

FIG. 2 shows a schematic flowchart of an object recognition method in an embodiment. The object recognition method provided by this disclosure is introduced below in combination with FIG. 1B, FIG. 1C, and FIG. 2. The method may be applied to a computer device, such as a server 104 as shown in FIG. 1A, and mainly includes the followings.

S202: Obtain a candidate object set.

Objects are objects having categories to which they belong, and in a scenario of predicting whether objects own house property, the categories to which the objects belong may be "in a state of owning house property" or "not in a state of owning house property"; and in a scenario of predicting whether objects own cars, the categories to which the objects belong may be "in a state of owning cars" or "not in a state of owning cars". Candidate objects are objects which wait for being picked to be used for model training, and representative objects may be picked from the candidate object set to be used for model training. For example, the objects A, B, C, D and E shown in FIG. 1 are the candidate objects; where a plurality of candidate objects form the candidate object set, that is, the candidate object set includes the plurality of candidate objects, in which plurality means at least two.

In an embodiment of this disclosure, the computer device may obtain the candidate object set in response to a sample selecting instruction. The candidate object set may be carried in the sample selecting instruction, and may also be pre-stored.

S204: Obtain a plurality of pieces of candidate object information of the candidate objects on a plurality of dimensions, perform feature extraction on each piece of the candidate object information to obtain candidate object features corresponding to each piece of the candidate object information, fuse the candidate object features to obtain object extraction features corresponding to the candidate objects, and perform object category probability recognition based on the object extraction features to obtain a recognition probability that the candidate objects belong to a target object category.

The object information is information related to the objects, such as at least one of object gender information, object device information or information of a network connected with an object device. The object device may include a smart watch, a mobile phone or a laptop used by an object, and the device information may include at least one of a device resolution, or the number of cores of a central processing unit (CPU) of the device. If the object device has a surfing function, then the network connected with the object device may include wireless fidelity (WiFi) and a mobile network. If the network connected with the object device is WiFi, then the information of the network connected with the object device may include at least one of earliest time of connecting WiFi every day, or the number of different WiFi connected. When an object is to be picked for model training, the object Is a candidate object, and information of the object may be called candidate object information.

The candidate object features are features obtained by performing feature extraction on the candidate object information. As the candidate object information may be divided into a plurality of dimensions, such as gender information of the candidate objects, device information of the candidate objects and information of a network connected with a device of the candidate objects, different candidate object features may be obtained by performing feature extraction on different candidate object information, such as features obtained by performing feature extraction on the gender information of the candidate objects, and features obtained by performing feature extraction on the device information of the candidate objects.

The object extraction features are features obtained after fusing the candidate object features of the same candidate object on a plurality of dimensions. For example, as for an object A belonging to the candidate objects, feature extraction is performed on gender information, device information and information of a network connected with a device of the object A to obtain candidate object features on a plurality of dimensions, the candidate object features on these dimensions are denoted as $a^x$, $a^y$ and $a^z$ respectively, then $a^x$, $a^y$ and $a^z$ may be fused to obtain $a^r$, and an object extraction feature of the object A is obtained based on $a^r$.

A manner of fusing the candidate object features may be summing and averaging $a^x$, $a^y$ and $a^z$, or summing $a^x$, $a^y$ and $a^z$, or performing weighted summing and then averaging on $a^x$, $a^y$ and $a^z$, or further inputting these features into a full connection layer for processing to obtain a fused feature.

The fused candidate object features may be the candidate object features on all the dimensions, and correspondingly, the obtained object extraction features include one feature value. Exemplarily, if a candidate object has candidate object features on p dimensions $(a^1, a^2, a^3, \ldots, a^p)$, then the candidate object features on the p dimensions may be fused, obtained $a^r$ is used as a feature value of an object extraction feature, and the object extraction feature includes one feature value.

The fused candidate object features may also be the candidate object features on a part of the dimensions, and correspondingly, the obtained object extraction features include more than one feature value. Exemplarily, if a candidate object has candidate object features on q dimensions $(a^1, a^2, a^3, \ldots, a^q)$, then only the candidate object features $a^1$, $a^2$ and $a^3$ may be fused, obtained $a^r$ is concatenated with other candidate object features that are not fused to obtain feature values of an object extraction feature, and the object extraction feature includes at least one feature value.

In this step, the computer device may obtain the plurality of pieces of candidate object information of the candidate objects, perform feature extraction on each piece of the candidate object information to obtain the candidate object features corresponding to each piece of the candidate object information, and fuse the candidate object features to obtain the object extraction features of the candidate objects, such as the object extraction feature a of the object A, the object extraction feature b of the object B, the object extraction feature c of the object C, the object extraction feature d of the object D and the object extraction feature e of the object E as shown in FIG. 1, and each object extraction feature includes at least one feature value, respectively represented as $[a^1, a^2, a^3, \ldots, a^n]$, $[b^1, b^2, b^3, \ldots, b^n]$, $[c^1, c^2, c^3, \ldots, c^n]$, $[d^1, d^2, d^3, \ldots, d^n]$, and $[e^1, e^2, e^3, \ldots, e^n]$.

The categories to which the objects belong may be called object categories. The target object category is an object category to be recognized by an object recognition model. For example, in the scenario of predicting whether objects own house property, an object category to be recognized by the object recognition model is "in a state of owning house property" and "not in a state of owning house property". At this moment, "in a state of owning house property" or "not in a state of owning house property" is a target object category. For another example, in the scenario of predicting whether objects own cars, an object category to be recognized by the object recognition model is "in a state of owning cars" and "not in a state of owning cars", and at the moment, "in a state of owning cars" or "not in a state of owning cars" is a target object category.

The recognition probability that the objects belong to the target object category is the possibility that the objects belong to the target object category. The larger the recognition probability that the objects belong to the target object category, the larger the possibility that the objects belong to the target object category; and the smaller the recognition probability that the objects belong to the target object category, the smaller the possibility that the objects belong to the target object category.

Exemplarily, since the feature a of the object A, the feature b of the object B, the feature c of the object C, the feature d of the object D, and the feature e of the object E obtained by the computer device describe the corresponding objects, the computer device analyzes the feature a, the feature b of the object B, the feature c of the object C, the feature d of the object D and the feature e of the object E respectively to determine that a recognition probability that the object A belongs to the target object category is $P_A$, a recognition probability that the object B belongs to the target object category is $P_B$, a recognition probability that the object C belongs to the target object category is $P_C$, a recognition probability that the object D belongs to the target object category is $P_D$, and a recognition probability that the object E belongs to the target object category is $P_E$. For example, the computer device may input the object extraction features of the candidate objects into a classification layer of an object screening model respectively, and the classification layer may output the recognition probability that the candidate objects belong to the target object category.

S206: Cluster the object extraction features corresponding to the candidate objects to obtain sub extraction feature sets corresponding to clustering categories, and constitute one sub object set from candidate objects corresponding to the object extraction features in the same sub extraction feature set.

Clustering the object extraction features corresponding to the candidate objects may place similar candidate objects together and separate dissimilar candidate objects. As the candidate objects are described through the object extraction features, such clustering is clustering of the object extraction features of the candidate objects, where a set formed by the object extraction features corresponding to the plurality of candidate objects which are placed together may be seen as a sub extraction feature set, the candidate objects corresponding to the object extraction features in the same sub extraction feature set constitute one sub object set, and exemplarily, the object extraction features of the objects A, E and C are placed in the same sub extraction feature set, and the objects A, E and C constitute a sub object set. A plurality of sub object sets may be obtained after clustering, and the number of the sub object sets is consistent with the number of the clustering categories.

In addition, a similarity between the object extraction features corresponding to the candidate objects belonging to the same sub object set is greater than a similarity between the object extraction features corresponding to the candidate objects belonging to different sub object sets. For example, the objects A, E and C belong to the same sub object set, the objects B and D belong to the same sub object set, then a similarity between the respective object extraction features of the object A and the object E is greater than a similarity between the respective object extraction features of the object A and the object B, and a similarity between the respective object extraction features of the object E and the object C is greater than a similarity between the respective object extraction features of the object E and the object D.

The above clustering may be achieved through a K-means algorithm or an algorithm of clustering by fast search and find of density peaks (DPC).

S208: Obtain, for the sub object sets formed according to the sub extraction feature sets, representative objects by selecting from the sub object sets respectively based on recognition probabilities corresponding to the candidate objects in the sub object sets.

Representative objects corresponding to the sub object sets are candidate objects having representativeness in the candidate objects in the sub object sets, and the representative objects can represent the candidate objects in the sub object sets. The number of the representative objects obtained by selecting from one sub object set may be one or more, and the number of the representative objects obtained by selection is determined according to a set first preset condition. Candidate object information of the representative objects obtained by selection is used for training a target object recognition model, and the trained target object recognition model is configured to recognize whether objects belong to the target object category.

For example, after obtaining a sub object set including the objects A, C and E, the computer device uses the object A as a representative object according to the recognition probabilities corresponding to the objects. For another example, after a sub object set including the objects B and D is obtained, the object D is used as a representative object according to the recognition probabilities corresponding to the objects. For yet another example, after the sub object set including the objects A, C and E is obtained, the objects A and E are used as representative objects according to the recognition probabilities corresponding to the objects.

In some embodiments, S208 may specifically include the following steps: obtaining, by the computer device, for the sub object sets formed according to the sub extraction feature sets, candidate objects with a recognition probability meeting a first preset condition respectively from the sub object sets as the corresponding representative objects in the sub object sets. The first preset condition includes at least one of: a recognition probability being greater than a probability threshold value, or, a recognition probability rank being before a first ranking threshold value. The two first preset conditions are specifically introduced below:

(1) First preset condition: the recognition probability being greater than the probability threshold value.

Under this first preset condition, the computer device may use the candidate objects, in the sub object sets, with the recognition probabilities of the candidate objects greater than the probability threshold value as the representative objects.

In an embodiment, the representative objects of the sub object sets are determined through the probability threshold value, the accuracy of selecting the representative objects is guaranteed, a training sample set for constructing the target object recognition model is obtained, and thus prediction accuracy of the target object recognition model is guaranteed.

In some scenarios, corresponding candidate objects may be selected from the sub object sets respectively through the same probability threshold value. However, in some scenarios, recognition probability threshold values of all the candidate objects included in certain sub object sets are all less than the probability threshold value, and at the moment, representative objects of the sub object sets cannot be selected through the probability threshold value, resulting in the sub object sets being skipped.

In order to avoid the problem that skipping is caused due to the fact that representative objects cannot be selected for certain sub object sets, in some embodiments, the computer device may set probability threshold values of a plurality of grades, such as a probability threshold value of a high grade, a probability threshold value of a medium grade and a probability threshold value of a low grade, and when representative objects in the sub object sets cannot be selected according to the probability threshold value of the current grade, the representative objects in the sub object sets may be selected again by utilizing the probability threshold value whose grade is lower than the current grade.

For example, when representative objects of the sub object set including the objects A, C and E cannot be selected by utilizing the probability threshold value of the high grade, the representative objects of the sub object set may be selected again by utilizing the probability threshold value of the medium grade; and when the representative objects of the sub object set still cannot be selected by utilizing the probability threshold value of the medium grade, the representative objects of the sub object set may be selected by utilizing the probability threshold value of the low grade.

In the above scenario, if the representative objects of the sub object set including the objects A, C and E cannot be selected by utilizing the set probability threshold values of all grades, then, to guarantee that the sub object set is not skipped, the candidate object with the maximum recognition probability in the sub object set may be used as the representative object of the sub object set, or the candidate objects with the recognition probabilities ranking at few top positions (e.g., top 3 and top 5) in the sub object set in a descending order of the recognition probabilities may be used as the representative objects.

(2) First preset condition: a probability rank being before a first ranking threshold value.

The probability rank is a rank from largest to smallest of the recognition probabilities; and the first ranking threshold value may be 3, 5 or other numeric values.

For example, for the sub object set including the objects A, C and E, according to the rank from largest to smallest of the recognition probabilities of the candidate objects, the computer device may obtain that the recognition probability of the object A>the recognition probability of the object E>the recognition probability of the object C. If the first ranking threshold value is 2, then the object A and the object E may be used as the representative objects of the sub object set.

In an embodiment, the representative objects of the sub object sets are determined through the probability rank, the accuracy of the representative objects is guaranteed, a training sample set for constructing the target object recognition model is obtained, and thus prediction accuracy of the target object recognition model is guaranteed.

In some embodiments, after the representative objects are obtained, the computer device may add the representative objects into the training sample set. The training sample set is used for performing model training to obtain, via training, the target object recognition model for recognizing the target object category.

Samples in the training sample set are samples used for performing model training, for example, during training, object information corresponding to objects in the training samples may be obtained as object features, object categories corresponding to the objects in the training samples are obtained as object labels, and supervised training is performed based on the object features and the object labels to obtain the target object recognition model.

The target object recognition model may include a support vector machine (SVM), a convolutional neural network (CNN), a long short term memory (LSTM) or models such as a real-time attention based look-alike model (RALM).

The RALM is a look-alike model based on similarities, and contains two parts, "object representation learning" and "look-alike model learning".

1) The RALM adopts a double-tower structure, an input on the left side is embedding of seed objects, an input on the right side is embedding of target objects, and mapping of the embedding on the two sides to a low-dimensional space is completed through a full connection (FC) layer. As the embedding of the target objects on the right side is obtained through object representation learning, to prevent over-fitting, the first FC layer of the double-tower is shared. After the FC layer, a tower on the left side may obtain embedding corresponding to each cluster, and then the embedding of each cluster and the embedding of the target objects are inputted to a global attention unit and a local attention unit respectively to obtain global embedding and local embedding.

2) Iterative training stage of RALM. In a back propagation process, since a value of user embedding may change, to guarantee that embedding of a seed object cluster and the user embedding are kept synchronous, a clustering operation shall be performed again after each round of iteration.

3) Compared to other models, the RALM has two effects:

a) The effect of "object representation learning" is optimized. For the problem of multi-fields object interest representation learning, the RALM introduces a deep interest network of an attention merge layer, which solves the problems of over-fitting and noise caused by strong correlation features and weak correlation features respectively.

b) The robustness and adaptiveness of the seed objects in representation learning are improved. A global representation of the seed objects is learned by utilizing the global attention unit, and the global attention unit weights a representation of a single object and punishes a noise object, which has more robustness than all object weights. A local representation of the seed objects is learned by utilizing the local attention unit, which weights correlation of the seed objects and the target objects. The local attention unit learns the representations of the seed objects dynamically based on the target objects, and learned representations of the seed objects are also different for different target objects, which greatly improves an expression ability of the representations of the seed objects.

4) RALM training: the RALM involves a clustering process, the clustering process requires iteration and is relatively time-consuming, and the number of clustering centers directly affects the clustering effect. In the scenario of predicting the object house property state, it is preferred to select the number of online clustering centers of 50 to 80.

In this step, a plurality of models may be trained in parallel, a model with the best classification effect is selected therefrom, and parameter tuning is performed on the model with the best effect. Evaluation indexes for a classification effect of a model may include an area under curve (AUC), and the larger a value of the AUC, the more possible arranging a positive sample in front of a negative sample of a current model, and the better a classification result. Parameter tuning refers to grid optimization of hyper-parameters of a selected model to expect improvement of the evaluation index AUC.

In the above object recognition method, the object extraction features are obtained by performing feature extraction on the candidate object information, and since the candidate objects are clustered according to the object extraction features of the candidate objects, candidate objects belonging to the same category may be placed in the same sub object set. As the recognition probability that the candidate objects belong to the target object category is obtained according to the object extraction features of the candidate objects, the representative objects are obtained by selecting from the sub object sets respectively according to the recognition probability of the candidate objects, the representative objects having representativeness may be selected from the sub object sets belonging to the same category, the selected representative objects can cover the candidate objects of all categories and also have representative characteristics of each category.

When the target object recognition model is trained subsequently, the representative objects may be used as training samples, more samples for model training are dug out from massive samples, and thus the target object recognition model obtained by training using the candidate object information of the representative objects can dig out differences of different categories and representative characteristics of each category, thereby increasing the accuracy of predicting whether objects belong to the target object category.

In some embodiments, the object extraction features are obtained by performing feature extraction through the object screening model, and obtaining the object screening model includes the following steps: obtaining a seed object corresponding to the target object category; obtaining seed object information corresponding to the seed object, and forming a training sample with the seed object information as a training feature in the training sample and with the target object category as a label in the training sample; and performing model training based on the training sample to obtain the object screening model.

For objects whose categories are not annotated, category annotation may be performed on these objects through manual annotation or automatic annotation, when the accuracy of manual annotation and automatic annotation is high, an annotation result is relatively dependable, at the moment, objects whose categories have been annotated may be used as objects with high confidence coefficients, and the objects with the high confidence coefficients may be called seed objects.

In some scenarios, a negative sample is easier to obtain, a positive sample is more difficult to obtain. At this time, the seed object may be an object whose category is annotated as belonging to the target object category in the above objects with the high confidence coefficients; where the negative sample is an object not belonging to the target object category, and the positive sample is an object belonging to the target object category.

Object information of the seed object may be called the seed object information, and specific introduction of the object information may refer to the introduction of the object information corresponding to S204.

The object screening model is configured to predict a probability that an object whose category is not annotated belongs to the target object category, and this processing process may be seen as a process of annotating the object whose category is not annotated. The object screening model may be a deep factorization machine (DeepFM) model or a factorization machine (FM) model.

In this step, the object screening model is constructed by utilizing the seed object with the high confidence coefficient, when the seed object is the positive sample, a training sample may be formed with the seed object information as a feature of the training sample and with "the seed object belonging to the target object category" as a label of the training sample, and the training sample is utilized for model training to obtain the object screening model.

In an embodiment, the object screening model is constructed by utilizing the seed object, and as the confidence coefficient that the seed object belongs to the target object category is high, when the object screening model predicts whether other objects belong to the target object category, the prediction accuracy may be improved.

In some embodiments, the above steps of obtaining the plurality of pieces of candidate object information of the candidate objects and performing extraction to obtain the candidate object features corresponding to each piece of the candidate object information may specifically include: inputting, by the computer device, the plurality of pieces of candidate object information of the candidate objects on the plurality of dimensions to a feature extraction layer of the object screening model for feature extraction, to obtain the candidate object features corresponding to each piece of the candidate object information.

The above steps of fusing the candidate object features to obtain the object extraction features corresponding to the candidate objects, and performing object category probability recognition based on the object extraction features to obtain the recognition probability that the candidate objects belong to the target object category may specifically include: inputting, by the computer device, the candidate object features to a classification layer of the object screening model so as to make the classification layer fuse the candidate object features to obtain the object extraction features; and obtaining the recognition probability that the candidate objects belong to the target object category outputted after the classification layer performs object category probability recognition on the object extraction features.

The object screening model may include the feature extraction layer and the classification layer. The feature extraction layer is configured to extract deep layer features used for describing the objects, the feature extraction layer may be a convolutional layer, and the features extracted by the feature extraction layer may be called object features; and when the object information inputted to the feature extraction layer is the candidate object information, the features extracted by the feature extraction layer may be called the candidate object features or deep features. The classification layer mainly fuses the deep layer features extracted by the feature extraction layer to obtain the object extraction features, determines a category to which an object belongs according to the object extraction features and determines a recognition probability that the object belongs to the target object category, and the classification layer may be a full connection layer.

For example, the computer device may input gender information, device information and information of a network connected with a device of the object A to the feature extraction layer of the object screening model for feature extraction, so as to obtain the candidate object features corresponding to each piece of the candidate object information; and next, the computer device inputs the candidate object features to the classification layer of the object screening model to make the classification layer fuse the candidate object features to obtain an object extraction feature of the object A, and the classification layer is made to perform object category probability recognition based on the object extraction feature of the object A so as to obtain the recognition probability that the object A belongs to the target object category.

In an embodiment, for candidate objects whose categories are not annotated, the object screening model constructed based on the seed objects is utilized to predict whether these candidate objects belong to the target object category so as to obtain more samples required for training the target object recognition model, and the prediction accuracy of the target object recognition model is improved.

In some embodiments, the above steps of clustering the object extraction features corresponding to the candidate objects to obtain the sub extraction feature sets corresponding to the clustering categories, and forming one sub object set from the candidate objects corresponding to the object extraction features in the same sub extraction feature set specifically include: obtaining feature distances between the object extraction features corresponding to the different candidate objects; determining, for the object extraction features, a number of object extraction features located within a region where the object extraction features are located based on the feature distances, and obtaining regional object densities of the object extraction features based on the number; selecting clustering centers based on the regional object densities of the object extraction features, and performing clustering on the object extraction features based on the clustering centers to obtain the sub extraction feature sets corresponding to the clustering categories; and forming the one sub object set from the candidate objects corresponding to the object extraction features in the same sub extraction feature set.

The feature distances are distances between the object extraction features of the different candidate objects, for example, a feature distance between the object extraction features $[a^1, a^2, a^3, \ldots, a^n]$ and $[b^1, b^2, b^3, \ldots, b^n]$ of the candidate objects A and B may be $$\sqrt{(a^1-b^1)^2+(a^2-b^2)^2+\ldots+(a^n-b^n)^2}$$

The region where the object extraction features are located is a region around the object extraction features, and the region around the object extraction features may be a region within a preset radius with the object extraction features as the center.

In an embodiment, the regional object densities of the object extraction features of the candidate objects are calculated, which is introduced by taking an example of calculating a regional object density of the object extraction feature of the object A.

After feature distances between the object extraction feature of the object A and object extraction features of other objects are obtained, when it is determined that a feature distance between an object extraction feature of the object C and the object extraction feature of the object A is less than the preset radius, the computer device believes that the object extraction feature of the object C is located within a region of the preset radius with the object extraction feature of the object A as the center. In this way, whether the object extraction features of the other objects are located within the region of the preset radius with the object extraction feature of the object A as the center may be determined; and next, when it is determined that the object extraction feature of the object C and an object extraction feature of the object D are both located within the region of the preset radius with the object extraction feature of the object A as the center, it may be determined that the number of the object extraction features located within the region of the preset radius with the object extraction feature of the object A as the center is 2, and the number is used as the regional object density of the object extraction feature of the object A.

Similarly, in this way, the computer device may determine the regional object densities of the object extraction features of the objects B, C, D and E; before clustering is performed, when the regional object densities of the object extraction features of the object A and the object E are large, the object extraction feature of the object A and the object extraction feature of the object E may be used as clustering centers, and clustering is performed on the object extraction features of the objects B, C and D based on the two clustering centers. When, in an obtained clustering result, the object extraction feature of the object A, the object extraction feature of the object C and the object extraction feature of the object D are placed together to form a corresponding sub extraction feature set, and the object extraction feature of the object B and the object extraction feature of the object E are placed together to form a corresponding sub extraction feature set, the object A, the object C and the object D may be placed together to form a corresponding sub object set, and the object B and the object E may be placed together to form a corresponding sub object set.

In an embodiment, the regional object densities of the object extraction features are determined based on the feature distances between the object extraction features of the different candidate objects, the clustering centers are selected according to the regional object densities, the accuracy of clustering the object extraction features may be improved, then the candidate objects with relatively similar corresponding object extraction features may be placed to the same category, while the candidate objects whose corresponding object extraction features are not so similar are divided into different categories, the accuracy of classifying the corresponding candidate objects is improved, the representative objects selected from the sub object sets of each category subsequently can cover the candidate objects whose object extraction features have a large difference relatively comprehensively, the situation that the selected representative objects are small in difference and narrow in coverage is reduced, and thus the problem of the poor training effect of the target object recognition model caused by one-sidedness of selection of the representative objects is avoided, and the accuracy of recognizing the object categories of the trained target object recognition model is improved.

In some embodiments, the above steps of selecting the clustering centers based on the regional object densities of the object extraction features, and performing clustering on the object extraction features based on the clustering centers to obtain the sub extraction feature sets corresponding to the clustering categories may include: determining adjacent extraction features of the object extraction features in features with regional object densities greater than the regional object densities of the object extraction features; using feature distances between the object extraction features and the adjacent extraction features as target distances corresponding to the object extraction features; and selecting the clustering centers based on the regional object densities of the object extraction features and the target distances corresponding to the object extraction features.

The features with the regional object densities greater than the regional object densities of the object extraction features are: as for a target object extraction feature, other object extraction features with regional object densities greater than a regional object density of the target object extraction feature. The adjacent extraction features are: in the other object extraction features with the regional object densities greater than the regional object density of the target object extraction feature, object extraction features with minimum feature distances to the target object extraction feature.

In an embodiment of this disclosure, the clustering centers may be selected in combination with the regional object densities of the object extraction features and the target distances. Introduction is made by taking an example of calculating a target distance of the object extraction feature of the object C.

When the regional object density of the object extraction feature of the object A and the regional object density of the object extraction feature of the object E are greater than the regional object density of the object extraction feature of the object C, and a feature distance |AC| between the object extraction feature of the object A and the object extraction feature of the object C is less than a feature distance |EC| between the object extraction feature of the object E and the object extraction feature of the object C, the computer device may use the object extraction feature of the object A as the object extraction feature adjacent to the object extraction feature of the object C, and use the feature distance |AC| between the object extraction feature of the object A and the object extraction feature of the object C as the target distance of the object C.

After the computer device obtains the target distances of the object extraction features of the objects according to the above manner, object extraction features with large regional object densities and large target distances may be used as the clustering centers.

In the above embodiment, the corresponding target distances are determined based on the object extraction features adjacent to the object extraction features of the candidate objects, the clustering centers are selected in combination with the target distances and the regional object densities, the accuracy of clustering the object extraction features may be improved, the representative objects selected from the sub object sets of each category subsequently can cover the candidate objects whose object extraction features have a large difference relatively comprehensively, and thus the problem of the poor training effect of the target object recognition model caused by one-sidedness of selection of the representative objects is avoided, the accuracy of recognizing the object categories of the trained target object recognition model is improved, and the accuracy of object recognition is improved.

In some embodiments, the above steps of performing clustering on the object extraction features based on the clustering centers to obtain the sub extraction feature sets corresponding to the clustering categories may include: obtaining, by the computer device, a current object extraction feature whose clustering category is to be determined; obtaining clustering centers with regional object densities greater than a regional object density of the current object extraction feature as candidate clustering centers corresponding to the current object extraction feature; and selecting an adjacent clustering center corresponding to the current object extraction feature from a candidate center set based on distances between the current object extraction feature and the candidate clustering centers, and adding the current object extraction feature into the sub extraction feature set corresponding to the adjacent clustering center.

The computer device may form the candidate center set according to the candidate clustering centers corresponding to the current object extraction feature. For example, the current object extraction feature is an object extraction feature of an object F, the clustering centers include an object extraction feature of an object G, an object extraction feature of an object I, an object extraction feature of an object K and an object extraction feature of an object J, in the object extraction features of the objects included in the clustering centers, a regional object density of the object extraction feature of the object I and a regional object density of the object extraction feature of the object K are both greater than a regional object density of the object extraction feature of the object F, a regional object density of the object extraction feature of the object G and a regional object density of the object extraction feature of the object J are both less than the regional object density of the object extraction feature of the object F, and then the object extraction feature of the object I and the object extraction feature of the object K may be used as candidate clustering centers corresponding to the object extraction feature of the object F, and the candidate center set is formed.

The adjacent clustering center is a clustering center with a minimum feature distance to the current object extraction feature in the candidate center set corresponding to the current object extraction feature.

In the two candidate clustering centers, namely the object extraction feature of the object I and the object extraction feature of the object K, when a feature distance between the object extraction feature of the object F and the object extraction feature of the object I is less than a feature distance between the object extraction feature of the object F and the object extraction feature of the object K, the computer device may use the object extraction feature of the object I as an adjacent clustering center of the object extraction feature of the object F, and place the object extraction feature of the object F into a sub extraction feature set corresponding to the object I.

In an embodiment, for the current object extraction feature whose clustering category is to be determined, the candidate clustering centers of the current object extraction feature are determined based on the regional object densities, the adjacent clustering center is determined based on the distances between the current object extraction feature and the candidate clustering centers, and then the current object extraction feature is placed into the corresponding sub extraction feature set, which improves the accuracy of cluster division.

In some embodiments, the object recognition method provided by this disclosure further includes: determining an influence weight of the candidate objects for a training gradient change of the target object recognition model based on the recognition probability that the candidate objects belong to the target object category; and selecting candidate objects meeting a second preset condition from the candidate object set based on the influence weight of the candidate objects for the training gradient change of the target object recognition model, and adding the candidate objects meeting the second preset condition into a training sample set.

The target object recognition model may use a gradient descent training manner, and training samples used in each round of training may affect the gradient change of the model. The influence weight of the candidate objects for the training gradient change of the target object recognition model reflects the degree of influence of the candidate objects for the gradient change in the training process of the target object recognition model, and the influence weight for the training gradient change has a positive correlation relationship with the recognition probability, that is, the larger the recognition probability that the candidate objects belong to the target object category, the larger the gradient change of training the target object recognition model with the candidate objects.

The second preset condition includes at least one of: the influence weight for the training gradient change being greater than an influence weight threshold value, or an influence weight rank being before a second ranking threshold value. The two second preset conditions are introduced below:

(1) Second preset condition: the influence weight for the training gradient change being greater than the influence weight threshold value.

For all the candidate objects included in the candidate object set, the computer device determines influence weights of the candidate objects for the training gradient change of the object recognition model based on the recognition probabilities of the candidate objects, and adds the candidate objects with the influence weights for the training gradient change greater than the influence weight threshold value into the training sample set.

(2) Second preset condition: the influence weight rank for the training gradient change being before the second ranking threshold value.

For all the candidate objects included in the candidate object set, the computer device determines the influence weights of the candidate objects for the training gradient change of the object recognition model based on the recognition probabilities of the candidate objects; and the candidate objects are ranked in an order from largest to smallest of the influence weights for the training gradient change, and the candidate objects with the influence weights for the training gradient change ranking at few top positions are added into the training sample set.

In an embodiment, on the basis of selecting the representative objects from the sub object sets, the corresponding influence weights for the training gradient change are determined in combination with the recognition probability that the candidate objects belong to the target object category, the candidate objects meeting the second preset condition are selected as the training samples, the training samples are selected through double strategies of "most representative" and "best recognition", the selected representative objects can cover the candidate objects of all categories and also have representative characteristics of each category, and thus the target object recognition model obtained by training using the candidate object information of the representative objects can dig out differences of the different categories as well as the representative characteristics of each category, so that the accuracy of predicting whether the objects belong to the target object category is improved.

In some embodiments, training the target object recognition model includes the following steps: selecting a first training object and a second training object which are similar from the training sample set, and forming an object group from the first training object and the second training object; inputting training object information corresponding to the training objects in the object group to the same feature extraction layer, and obtaining training object features corresponding to the training objects respectively by extraction; obtaining an object similarity between the training objects in the object group based on the training object features; obtaining a model loss value based on the object similarity; the model loss value having a negative correlation relationship with the object similarity; and training an object recognition model based on the model loss value to obtain the target object recognition model.

Object information of the training objects may be called the training object information, and introduction about the object information may refer to the content of above S204. The model loss value has the negative correlation relationship with the object similarity, for example, the larger the model loss value, the larger the object similarity, and the smaller the model loss value, the smaller the object similarity.

When the target object recognition model is the RALM, as the RALM adopts the double-tower structure, the first training object and the second training object which are similar may be selected from the training sample set to form the object group; next, object information of the first training object and object information of the second training object are inputted to the same feature extraction layer to complete mapping from a high-dimensional space to a low-dimensional space, features (e.g., embedding features) extracted by the feature extraction layer are used as the training object features, and the object similarity between the first training object and the second training object is obtained based on the training object feature of the first training object and the training object feature of the second training object. A loss value of the RALM having the negative correlation relationship with the object similarity is obtained based on the object similarity; and the object recognition model is trained based on the model loss value to construct the RALM, so as to obtain the target object recognition model.

In the above embodiment, the similar training objects are inputted to the same feature extraction layer to obtain the corresponding training object features, and model training is performed according to the model loss value obtained through the similarity between the training objects, so that the prediction accuracy of the constructed target object recognition model is guaranteed.

In some embodiments, obtaining the training object information corresponding to the training objects includes the following steps: obtaining, by the computer device, object information categories; obtaining a corresponding time dimension set and information statistics angle of the training objects in the object information categories; obtaining object information statistical values corresponding to the training objects obtained by statistics based on the information statistics angle in information statistics time dimensions; the object information statistical values being information statistical values corresponding to the object information categories; and performing information aggregation on the object information statistical values corresponding to the information statistics time dimensions in the time dimension set, and using object information obtained by aggregation as the training object information corresponding to the training objects.

The object information for describing the objects has different categories, and the categories may be called the object information categories, such as a time length of playing games or a time length of browsing commodities. The information statistics time dimensions are time dimensions for statistics of the object information, and represent time lengths corresponding to statistical information; and the time dimension set includes a plurality of information statistics time dimensions, such as one day, one week, three months and six months. The information statistics angle is a time unit for statistics, such as the unit of one day and the unit of one week.

The object information statistical values corresponding to the training objects are obtained by statistics based on the information statistics angle in information statistics time dimensions. For example, if the information statistics time dimension is one week, and the information statistics angle is one day, after a time length of playing games of an object within one week is obtained, a time length of playing games of the object every day may be determined, the time length of playing games of the object every day is used as an object information statistical value, and the object information statistical value corresponds to an object information category, namely the time length of playing games.

Similarly, for other information statistics time dimensions, the object information statistical values under the information statistics angle may also be determined. For example, the time length of playing games of the object every day may be determined under the information statistics time dimension of a time length of playing games of the object in three months.

In the above manner, after obtaining the corresponding time dimension set and information statistics angle of the training objects in the object information categories, the computer device determines the object information statistical values corresponding to the training objects obtained by statistics based on the information statistics angle in the information statistics time dimensions, aggregates the object information statistical values of the same object information category under different time dimensions (an aggregation manner may be at least one of averaging, variance solving, standard deviation solving or summing), and then uses the aggregated object information as the training object information corresponding to the training objects to be used for model training.

In an embodiment, since the training object information used for model training is obtained by aggregating the same object information category under the different information statistics time dimensions, the situation that values of object information of the same category under different time dimensions are all plugged into a model to cause co-linearity, resulting in a poor model effect may be avoided, the prediction effect of the model is improved, the accuracy of object recognition is improved, the effectiveness of information transfer is improved, pushing massive information to mismatched objects is avoided, and computer resources are saved.

In some embodiments, the above steps of performing information aggregation on the object information statistical values corresponding to the information statistics time dimensions in the time dimension set, and using the object information obtained by aggregation as the training object information corresponding to the training objects may include: obtaining, by the computer device, a comprehensive information statistical value based on the object information statistical values corresponding to the information statistics time dimensions in the time dimension set; determining statistical value differences between the object information statistical values and the comprehensive information statistical value; and obtaining a statistical value discrete degree corresponding to the time dimension set based on the statistical value differences, and using the statistical value discrete degree as the training object information corresponding to the training objects.

The comprehensive information statistical value is obtained by statistics of the object information statistical values, such as an average value of a plurality of object information statistical values. The statistical value differences represent differences between any object information statistical value and the comprehensive information statistical value, and may be, for example, difference values or ratios. The statistical value discrete degree represents a discrete degree of each object information statistical value and has a positive correlation relationship with the statistical value differences. A manner of obtaining the statistical value discrete degree based on the statistical value differences may be: the computer device adds the statistical value differences and uses an added result as the obtained statistical value discrete degree. A manner of obtaining the statistical value discrete degree based on the statistical value differences may also be: summing of squares is performed on the statistical value differences, and a result of summing of squares is used as the statistical value discrete degree. A manner of obtaining the statistical value discrete degree based on the statistical value differences may also be: summing of squares is performed on the statistical value differences, rooting processing is performed on a result obtained by summing of squares, and a result obtained by rooting processing is used as the statistical value discrete degree.

For example, assuming that there are three information statistics time dimensions, each information statistics time dimension has a corresponding object information statistical value; and next, the statistical value differences of the object information statistical values of the information statistics time dimensions and the comprehensive information statistical value are determined to obtain three statistical value differences, summing of squares is performed on the three statistical value differences, rooting processing is performed on a result obtained by summing of squares, a result obtained by rooting processing is used as the statistical value discrete degree, and the statistical value discrete degree is used as the training object information corresponding to the training objects.

For example, if the time length of playing games every day determined under the information statistics time dimension of a time length of playing games of an object in three months is 3 hours, when the time length of playing games every day determined under the information statistics time dimension of a time length of playing games of an object in one month is 3.5 hours, and the time length of playing games every day determined under the information statistics time dimension of a time length of playing games of an object in one week is 2.5 hours, then an average value, 3 hours, of 3 hours, 3.5 hours and 2.5 hours may be used as the comprehensive information statistical value, and difference values (i.e., the statistical value differences) between these time lengths, 3 hours, 3.5 hours and 2.5 hours, and the comprehensive information statistical value are determined respectively to be 0 hour, 0.5 hour and 0.5 hour; and statistical value discrete degrees presented by 3 hours, 3.5 hours and 2.5 hours may be determined according to these difference values, 0 hour, 0.5 hour and 0.5 hour, and the statistical value discrete degrees are used as the training object information to be used for model training.

In the above embodiment, since the discrete degrees can represent an amplitude of behavior change of an object within a period of time, the model can learn the influence of the amplitude of the behavior change of the object on the object categories, and thus the training object information for model training is obtained according to the discrete degrees of the object information statistical values, and the prediction accuracy of the target object recognition model is improved.

An embodiment of this disclosure further provides an object recognition method, which may be applied to scenarios such as a cloud technology, cloud security, artificial intelligence and smart transport. This embodiment may be executed by a computer device, and includes the steps shown in FIG. 3:

S302: Obtain a seed object corresponding to a target object category.

Categories to which objects belong may be called object categories. The target object category is an object category to be recognized by an object recognition model. For example, in a scenario of predicting whether objects own house property, an object category to be recognized by the object recognition model is "in a state of owning house property" and "not in a state of owning house property", and at the moment, "in a state of owning house property" and "not in a state of owning house property" are target object categories; and for another example, in a scenario of predicting whether objects own cars, an object category to be recognized by the object recognition model is "in a state of owning cars" and "not in a state of owning cars", and at the moment, "in a state of owning cars" and "not in a state of owning cars" are target object categories. For objects whose categories are not annotated, category annotation may be performed on these objects through manual annotation or automatic annotation, if the accuracy of manual annotation and automatic annotation is high, an annotation result is relatively dependable, at the moment, objects whose categories have been annotated may be used as objects with high confidence coefficients, and the objects with the high confidence coefficients may be called seed objects.

S304: Obtain seed object information corresponding to the seed object, and constitute a training sample with the seed object information as a training feature in the training sample and with the target object category as a label in the training sample.

The object information of the seed object may be called the seed object information, such as gender information of the seed object, device information of candidate objects and information of a network connected with devices of the candidate objects, the training feature of the training sample is obtained by using the seed object information as a feature for describing the seed object, and a target object in S302 above is used as the label of the training sample; and the training feature of the training sample and the training label constitute the training sample.

S306: Perform model training based on the training sample to obtain an object screening model.

The object screening model is mainly configured to predict a probability that an object whose category is not annotated belongs to the target object category, that is, the object whose category is not annotated is annotated. The object screening model may be a DeepFM model or an FM model. The object screening model may include a feature extraction layer and a classification layer. The feature extraction layer is mainly configured to extract deep layer features for describing objects, and the classification layer mainly fuses the deep layer features extracted by the feature extraction layer to obtain object extraction features, determines a category to which an object belongs according to the object extraction features and determines a recognition probability that the object belongs to the target object category.

S308: Obtain a candidate object set.

Candidate objects included in the candidate object set are objects that are not annotated, namely objects with categories to which they belong not determined. The computer device may select a preset number of candidate objects optionally from a plurality of candidate objects that are not annotated in response to a sample selecting instruction, so as to form the candidate object set.

S310: Input a plurality of pieces of candidate object information of the candidate objects on a plurality of dimensions to the feature extraction layer of the object screening model for feature extraction, to obtain candidate object features corresponding to each piece of the candidate object information.

The candidate object features are features obtained by performing feature extraction on the candidate object information, and may be divided into a plurality of dimensions. The feature extraction layer may be a convolutional layer, and is configured to extract corresponding features respectively from the plurality of pieces of candidate object information of the candidate objects so as to obtain the candidate object features of the candidate object information.

S312: Input the candidate object features to the classification layer of the object screening model so as to make the classification layer fuse the candidate object features to obtain the object extraction features.

The object extraction features are features obtained after fusing the candidate object features on a part of dimensions or all the dimensions. The classification layer may be a full connection layer, and is configured to fuse the candidate object features to obtain the object extraction features corresponding to the candidate objects.

S314: Obtain the recognition probability that the candidate objects belong to the target object category outputted after the classification layer performs object category probability recognition on the object extraction features.

The recognition probability is the possibility that the objects belong to the target object category, such as a probability. The larger the recognition probability, the larger the possibility that the objects belong to the target object category, and the smaller the recognition probability, the smaller the possibility that the objects belong to the target object category.

After the above classification layer obtains the object extraction features, the classification layer performs object category probability recognition on the object extraction features to obtain the recognition probability that the candidate objects belong to the target object category.

S316: Obtain feature distances between the object extraction features corresponding to the different candidate objects.

The feature distances are distances between the object extraction features of the different candidate objects, for example, if a distance between object extraction features $[a^1, a^2, a^3, \ldots, a^n]$ and $[b^1, b^2, b^3, \ldots, b^n]$ of objects A and B is calculated, the feature distance may be $$\sqrt{(a^1-b^1)^2+(a^2-b^2)^2+\ldots+(a^n-b^n)^2}$$

For any two candidate objects in the candidate object set, the computer device may determine the feature distance between any two candidate objects according to the above formula.

S318: Determine, for the object extraction features, a number of object extraction features located within a region where the object extraction features are located based on the feature distances, and obtain regional object densities of the object extraction features based on the number.

The region where the object extraction features are located is a region around the object extraction features, and the region around the object extraction features may be a region within a preset radius with the object extraction features as the center. For example, in a scenario of calculating a regional object density of the object extraction feature of the object A, after feature distances between the object extraction feature of the object A and object extraction features of other objects are obtained, when it is determined that a feature distance between an object extraction feature of an object C and the object extraction feature of the object A is less than the preset radius, the computer device may believe that the object extraction feature of the object C is located within a region of the preset radius with the object extraction feature of the object A as the center; in this way, whether the object extraction features of the other objects are located within the region of the preset radius with the object extraction feature of the object A as the center may be determined; and next, when it is determined that the object extraction feature of the object C and an object extraction feature of an object D are located within the region of the preset radius with the object extraction feature of the object A as the center, the number of the object extraction features located within the region of the preset radius with the object extraction feature of the object A as the center is 2, and the number is used as the regional object density of the object extraction feature of the object A.

Similarly, in this way, regional object densities of the object extraction features of the objects B, C, D and E may be determined.

S320: Determine adjacent extraction features of the object extraction features in features with regional object densities greater than the regional object densities of the object extraction features.

The features with the regional object densities greater than the regional object densities of the object extraction features refer to, as for a target object extraction feature, other object extraction features with regional object densities greater than a regional object density of the target object extraction feature.

The adjacent extraction features refer to, in the other object extraction features with the regional object densities greater than the regional object density of the target object extraction feature, object extraction features with minimum feature distances to the target object extraction feature.

For example, when the regional object density of the object extraction feature of the object A and the regional object density of the object extraction feature of the object E are greater than the regional object density of the object extraction feature of the object C, and a feature distance |AC| between the object extraction feature of the object A and the object extraction feature of the object C is less than a feature distance |EC| between the object extraction feature of the object E and the object extraction feature of the object C, the object extraction feature of the object A may be used as the object extraction feature adjacent to the object extraction feature of the object C, that is, the object extraction feature of the object A is used as the adjacent extraction feature of the object C.

S322: Use feature distances between the object extraction features and the adjacent extraction features as target distances corresponding to the object extraction features.

For example, introduction is made by taking an example of calculating a target distance of the object extraction feature of the object C: the computer device may further use the feature distance |AC| between the object extraction feature of the object A and the object extraction feature of the object C as the target distance of the object C.

S324: Select clustering centers based on the regional object densities of the object extraction features and the target distances corresponding to the object extraction features.

After the computer device obtains the target distances of the object extraction features of the objects according to the above manner, object extraction features with large regional object densities and large target distances may be used as the clustering centers.

S326: Obtain a current object extraction feature whose clustering category is to be determined.

After selecting the clustering centers, the computer device may determine clustering categories to which the object extraction features of the other candidate objects in the candidate object set belong, and may select any object extraction feature from the object extraction features of the other candidate objects as the current extraction feature.

S328: Obtain clustering centers with regional object densities greater than a regional object density of the current object extraction feature as candidate clustering centers corresponding to the current object extraction feature; and constitute a candidate center set from the candidate clustering centers corresponding to the current object extraction feature.

The candidate center set is formed from the candidate clustering centers corresponding to the current object extraction feature, for example, the current object extraction feature is an object extraction feature of an object F, the clustering centers include an object extraction feature of an object G, an object extraction feature of an object I, an object extraction feature of an object K and an object extraction feature of an object J, in the object extraction features of the objects included in the clustering centers, a regional object density of the object extraction feature of the object I and a regional object density of the object extraction feature of the object K are both greater than a regional object density of the object extraction feature of the object F, a regional object density of the object extraction feature of the object G and a regional object density of the object extraction feature of the object J are both less than the regional object density of the object extraction feature of the object F, and then the object extraction feature of the object I and the object extraction feature of the object K may be used as candidate clustering centers corresponding to the object extraction feature of the object F, and the candidate center set is formed.

S330: Select an adjacent clustering center corresponding to the current object extraction feature from the candidate center set based on distances between the current object extraction feature and the candidate clustering centers, and add the current object extraction feature into a sub extraction feature set corresponding to the adjacent clustering center.

The adjacent clustering center refers to a clustering center with a minimum feature distance to the current object extraction feature in the candidate center set corresponding to the current object extraction feature.

For example, in the two candidate clustering centers, namely the object extraction feature of the object I and the object extraction feature of the object K, if a feature distance between the object extraction feature of the object F and the object extraction feature of the object I is less than a feature distance between the object extraction feature of the object F and the object extraction feature of the object K, then the object extraction feature of the object I may be used as an adjacent clustering center of the object extraction feature of the object F, and the object extraction feature of the object F is placed into a sub extraction feature set corresponding to the object I.

S332: Constitute a sub object set from the candidate objects corresponding to the object extraction features in the sub extraction feature set.

For example, the object extraction features of the objects A, E and C are placed in the same sub extraction feature set, and the computer device may constitute a sub object set from the objects A, E and C.

S334: Obtain candidate objects with a recognition probability meeting a first preset condition from the sub object set as corresponding representative objects in the sub object set.

For example, after obtaining the sub object set including the objects A, C and E, the computer device uses the object A as a representative object according to the recognition probabilities of the objects. For another example, after obtaining a sub object set including the objects B and D, the computer device uses the object D as a representative object according to the recognition probabilities of the objects.

S336: Add the representative objects into a training sample set.

Samples in the training sample set are samples used for performing model training, for example, during training, object information corresponding to objects in the training samples may be obtained as object features, and object categories corresponding to the objects in the training samples are obtained as object labels.

S338: Determine an influence weight of the candidate objects for a training gradient change of a target object recognition model based on the recognition probability that the candidate objects belong to the target object category.

The influence weight for the training gradient change is a gradient change degree in a training process of an object recognition model, and the influence weight for the training gradient change has a positive correlation relationship with the recognition probability, that is, the larger the recognition probability that the candidate objects belong to the target object category, the larger the gradient change of training the object recognition model with the candidate objects.

The computer device may make the recognition probability that the candidate objects belong to the target object category and the influence weight for the training gradient change have a positive correlation relationship, to obtain the influence weight of the candidate objects for the training gradient change of the target object recognition model.

S340: Select candidate objects meeting a second preset condition from the candidate object set based on the influence weight of the candidate objects for the training gradient change of the target object recognition model, and add the candidate objects meeting the second preset condition into a training sample set.

The second preset condition includes at least one of: the influence weight for the training gradient change being greater than an influence weight threshold value, or an influence weight rank being before a second ranking threshold value. The two second preset conditions are introduced below:

(1) Second preset condition: the influence weight for the training gradient change being greater than the influence weight threshold value.

For all the candidate objects included in the candidate object set, influence weights of the candidate objects for the training gradient change of the object recognition model are determined based on the recognition probabilities of the candidate objects, and the candidate objects with the influence weights for the training gradient change greater than the influence weight threshold value are added into the training sample set.

(2) Second preset condition: the influence weight rank being before the second ranking threshold value.

For all the candidate objects included in the candidate object set, the influence weights of the candidate objects for the training gradient change of the object recognition model are determined based on the recognition probabilities of the candidate objects; and the candidate objects are ranked in an order from largest to smallest of the influence weights for the training gradient change, and the candidate objects with the influence weights for the training gradient change ranking at few top positions are added into the training sample set.

S342: Perform model training by utilizing the training sample set, to obtain the target object recognition model configured to recognize the target object category.

The computer device performs supervised training based on the object features and the object labels of the training samples in the training sample set to obtain the target object recognition model. The target object recognition model may include a support vector machine (SVM), a convolutional neural network (CNN), a long short term memory (LSTM) or models such as a real-time attention based look-alike model (RALM).

In the above embodiment, the object extraction features are obtained by performing feature extraction on the candidate object information, and since the candidate objects are clustered according to the object extraction features of the candidate objects, it may be guaranteed that the candidate objects in the same sub object set are relatively similar; next, as the recognition probability that the candidate objects belong to the target object category is obtained according to the object extraction features of the candidate objects, the representative objects obtained by selecting from the sub object sets respectively according to the recognition probability of the candidate objects may represent other candidate objects in the sub object sets where the representative objects are located to the maximum extent; the representative objects are used as the training samples for model training, the prediction accuracy of the target object recognition model is improved, and effective transfer of information is achieved; moreover, the object screening model is constructed by utilizing the seed object, and as the confidence coefficient that the seed object belongs to the target object category is high, the prediction accuracy of the object screening model for whether other objects belong to target objects may be improved; and in addition, the training samples are selected by fusing two strategies of "most representative" and "best recognition", the prediction accuracy of the model is improved, the accuracy of object recognition is improved, the effectiveness of information transfer is improved, pushing massive information to mismatched objects is avoided, and computer resources are saved.

Figure 4:
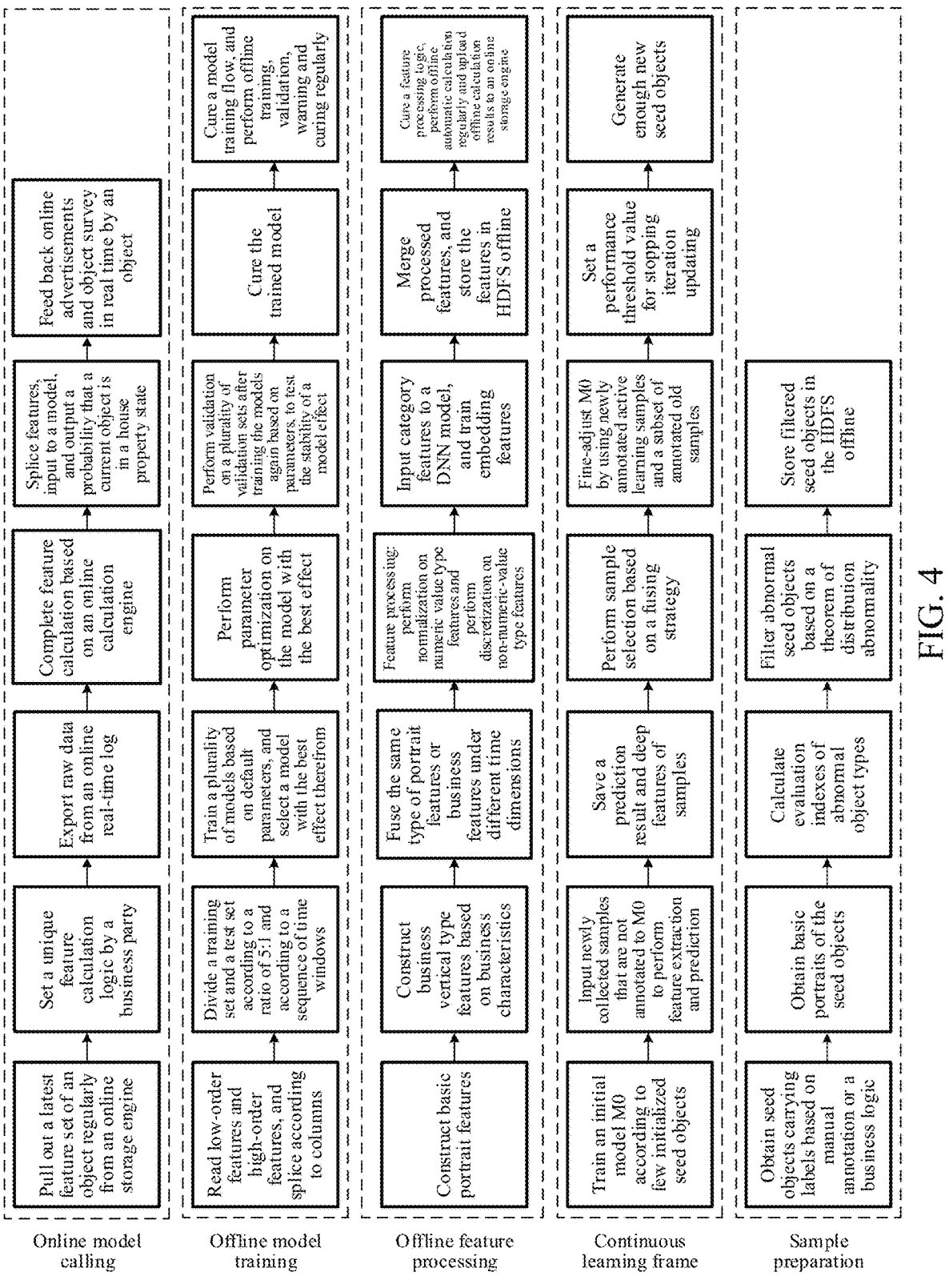
FIG. 4 is a diagram of a processing architecture of an object recognition method in an embodiment of this disclosure.
Figure 5:
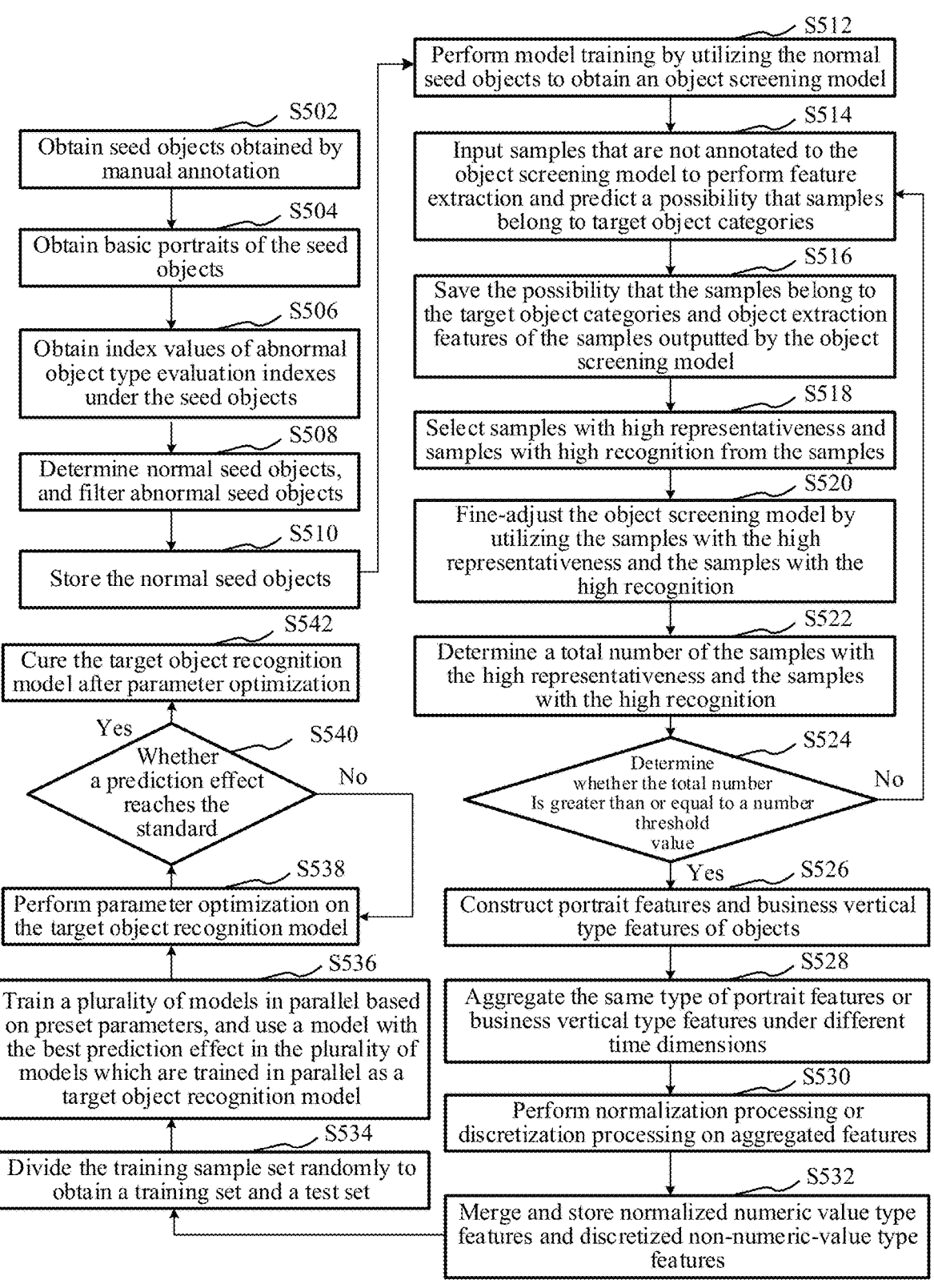
FIG. 5 is a schematic flowchart of offline processing of an object recognition method in an embodiment of this disclosure.

To better understand the above method, an application example of an object recognition method of this disclosure is described in detail below in combination with FIG. 4 to FIG. 6. A diagram of a technical architecture shown in FIG. 4 mainly includes 5 parts, where two parts, sample preparation and a continuous learning frame, may be seen as offline data preparation. FIG. 5 shows a process of constructing an offline model, which mainly corresponds to 4 parts in FIG. 4, sample preparation, the continuous learning frame, offline feature processing and offline model training. FIG. 6 shows a process of online calling, which mainly corresponds to the part of online model calling in FIG. 4. In the application example, "in a state of owning house property" and "not in a state of owning house property" may be seen as target object categories.

The application example may be executed by a computer device, and mainly includes: obtaining a seed object group based on manual annotation and a business logic, and generating seed object portrait features, including: object basic attributes (such as gender), device basic attributes (such as a device type) and network connection attributes (such as the number of times of connecting household Wi-Fi in last one month). Then, abnormal objects are filtered based on a portrait, for example: filtering an object using a particular application over 24 hours. In most business scenarios, the number of positive and negative samples directly obtained through manual annotation and business experience is quite small (generally less than 10 thousands), which cannot meet the requirement for fewest samples for training a model. In the application example, based on the continuous learning frame, and on the basis of few initial seed objects, more positive and negative samples required for model training are obtained in combination with a double-strategy fused manner of "a strategy of most representative" and "a strategy of best recognition" after multiple rounds of iteration on a DeepFM model. Next, in order to capture portrait information of an object in different time windows, in combination with a time dimension, different "pooling operations" are selected, and feature vectors obtained after convolution processing are generated. Then, results of feature engineering are inputted to a plurality of machine learning models for performing Baseline training, a best model is preliminarily screened out based on a model evaluation index AUC, optimal parameter optimization is performed on the best model, and a model with the best final effect is obtained. Finally, a model training flow is cured, and offline training, validation, warning and curing are performed regularly. Online work includes: first, a latest feature set of an object is pulled out regularly from an online storage engine; next, a unique feature calculation logic is set by a business party, raw data are exported from an online real-time log, and feature calculation is completed based on an online calculation engine; and then, features are concatenated and inputted to a model, and a probability that a current object has bought a house currently is outputted.

The application example may improve the accuracy of recognizing objects who have bought houses, especially in a scenario where the magnitude of seed objects is low, the high prediction accuracy and effect stability can still be guaranteed by the continuous learning frame and the deep learning model. For common business scenarios such as product operation and advertisement putting, the application example provides a more precise object grouping solution, the effectiveness of information transfer is improved, pushing massive information to mismatched objects is avoided, and computer resources are saved.

More specific content is introduced below:

1) Offline data preparation:
a) based on manual annotation and business experience, positive and negative training samples that are strongly correlated to business, normal in data distribution and reasonable in object portrait are found out; and
b) based on the continuous learning frame, on the basis of a), more high-quality positive and negative samples are produced.
2) Offline feature processing: portrait features of the training samples are constructed, and based on vertical characteristics of the features, high-dimensional feature vectors are produced in combination with time dimensions and different feature processing methods.
3) Offline model training: a model good in classification effect and stable is found based on the training samples and the feature vectors.

4) Online model calling: a label of whether online objects have bought houses is predicted in real time based on the model trained offline and online real-time features.

More specifically, the above offline data preparation includes two parts, sample preparation and the continuous learning frame; where the part, sample preparation, mainly includes the followings:

S502: Obtain seed objects obtained by manual annotation.

Specifically, seed objects with label information (the label information refers to a label of whether objects are in a state of owning house property) are obtained based on manual annotation and the business logic. A batch of seed objects are coarsely recalled based on rules, then filtering is performed based on a manual screening manner, and finally validation is performed based on the business logic.

S504: Obtain basic portraits of the seed objects.

The basic portraits include some non-private behavior data of the objects in applications, such as whether a certain particular application is installed, whether a harassment interception function provided by the application is used, and whether an answering assistant function provided by the application is used.

S506: Obtain index values of abnormal object type evaluation indexes under the seed objects.

In a business scenario, there will be a situation that false objects and computers control mobile phones. In order to remove the influence of unreal objects on modeling analysis, the abnormal object type evaluation indexes will be set based on business experience; the abnormal type evaluation indexes include but are not limited to a traffic use condition of objects in applications, time distribution of traffic generation, etc.; and the computer device may obtain an index value corresponding to each seed object according to the traffic use condition of each seed object in the applications and the time distribution of traffic generation.

S508: Use, based on index value distribution of the abnormal type evaluation indexes on the seed objects, seed objects with index values distributed in a normal interval as normal seed objects, use seed objects with index values distributed in an abnormal interval as abnormal seed objects, and filter the abnormal seed objects.

The "pauta criterion" may be used for judging the abnormal interval, specifically, assuming that a set of detection data only contains random errors, the set of detection data is subjected to calculation processing to obtain a standard deviation, an interval is determined according to a certain probability, it is considered that errors exceeding the interval do not belong to the random errors, instead, they are gross errors, and data containing the errors shall be removed.

S510: Store the normal seed objects.

Specifically, a storage manner may be offline storage, and a server used for storage may be a Hadoop distributed file system (HDFS), which facilitates rapid access of subsequent flows.

The continuous learning frame is to increase high-quality positive and negative samples, and this part mainly includes the followings:

S512: Perform model training by utilizing the above few normal seed objects to obtain an object screening model. The object screening model obtained at the moment may be recorded as MO. The object screening model may be a DeepFM model.

S514: Input samples that are not annotated to the object screening model to perform feature extraction and predict a probability that samples belong to target object categories, so as to annotate the samples.

S516: Save the probability that the samples belong to the target object categories and object extraction features of the samples outputted by the object screening model.

S518: Select samples with high representativeness and samples with high recognition from the samples.

A process of selecting the samples with the high representativeness mainly includes: clustering the samples to obtain sample clusters, and using, for any of the sample clusters, samples with the high probability that the samples belong to the target object categories in the sample cluster as the samples with the high representativeness.

A process of selecting the samples with the high recognition mainly includes: using, based on the thought of an expected gradient length, the samples with the high probability that the samples belong to the target object categories in all the samples as the samples with the high recognition.

S520: Fine-adjusting, if the object screening model needs further adjustment, the object screening model by utilizing the samples with the high representativeness and the samples with the high recognition until the adjusted object screening model reaches a performance threshold value.

S522: Determine a total number of the samples with the high representativeness and the samples with the high recognition.

S524: Determine whether the total number is greater than or equal to a number threshold value; and if yes, perform S526, and if not, perform S514 to continue iteration so as to obtain more samples with the high representativeness and more samples with the high recognition. The number threshold value is determined according to the number of training samples required for training the target object recognition model.

The above part, offline feature processing, mainly includes the following steps:

S526: Construct portrait features and business vertical type features of objects.

Basic portrait features are mainly constructed based on historical behavior data of the objects, including: object basic attributes, device basic attributes, network connection attributes, etc. The object basic attributes include but are not limited to: gender, a birthplace, a residence city, etc. The device basic attributes include but are not limited to: a mobile phone resolution, API Level, a number of CPU cores, etc. The network connection attributes include but are not limited to: a number of connected Wi-Fi, earliest time of connecting Wi-Fi every day, etc.

Based on business characteristics, the business vertical type features are constructed: the vertical type features include a click rate of objects for advertisements of particular types, a conversion rate, etc. In some scenarios, the advertisements of particular types are: house buying type advertisements, house renting type advertisements, decoration type advertisements, etc.

S528: Aggregate the same type of portrait features or business vertical type features under different time dimensions. The time dimensions may be last half a year/last 3 months/last one month/last one week. For the same type of features, feature values under the different time dimensions may be aggregated to obtain an aggregated feature value. Aggregation may be a plurality of manners such as summing, median and standard deviation.

S530: Perform normalization processing or discretization processing on the aggregated features, the processing including normalization on numeric value type features and discretization on non-numeric-value type features. The normalization method may be Gaussian normalization. Discretization processing includes the following methods:

i. One-Hot Encoding: for example, for features such as object gender.

ii. Count Encoding: for example, for a WiFi point of interest (POI) feature of an object, count encoding may be used for identifying the object and the interest degree of the POI. For example, the object went to a POI "food-Chinese cuisine-Cantonese cuisine" three times this week.

iii. Category Embedding: if many category features have strong sparsity, in order to avoid over-fitting of a model and improve the model stability, a neural network is introduced to convert a high-dimensional sparse classification variable into a low-dimensional dense embedding variable.

iv. NaN Embedding: for missing value processing of the features, methods such as "removing", "average value filling" and "missing marking" may be used, where the manner of converting a missing value into an embedding expression has the maximum positive earnings for the effect of the model.

v. Consolidation Encoding: a plurality of values under certain category variables may be concluded into same information. For example, a plurality of values of a system version feature of an Android mobile phone include "4.2", "4.4" and "5.0", and the three values may be concluded into "low-version Android system" based on experience. The processing manner of consolidation encoding can bring more positive earnings compared to direct one-hot of the feature "Android system version".

The above iii is mainly that category features are inputted to a deep neural network (DNN) model to train embedding features, and specifically, it may include the following content:

① WiFi Trajectory Embedding. Based on a masked self-supervised transformer-convolution neural network (MST-CNN) deep learning network, embedding is performed on WiFi connection trajectory data of an object, and Wi-Fi behavior mode information of the object is captured.

② App Traffic Embedding. Based on a manner of List-Embedding, embedding extraction is performed on a traffic use behavior list of an object using different categories of applications (Apps), such as Traffic Embedding of social type Apps, to obtain low-dimensional dense object behavior features.

S532: Merge and store normalized numeric value type features and discretized non-numeric-value type features. A storage manner may be storing in the HDFS offline, to facilitate rapid access of subsequent flows.

The computer device may also cure the feature processing logic of above S526 to S532, perform offline automatic calculation regularly and upload features obtained by offline calculation to an online storage engine for storage.

In addition, before S528, the computer device may also clean, filter and validate the portrait features and the business vertical type features of the objects. Since the features are produced through a plurality of strategy logic paths, it is difficult to guarantee the data quality of the features, so feature data quality monitoring is required. A specific method is as follows:

a) Based on business experience, a feature quality standard is formulated, and calculated features are cleaned, filtered and validated. The quality standard includes but is not limited to: a time length of using a particular App every day is less than 16 hours, etc.

b) According to a preset strategy, existing features are validated, and ineffective and abnormal features are removed. For example, a time length of using a certain App of an object every day cannot be greater than 24 hours, etc.

c) Features meeting business requirements are concatenated, features not meeting the requirements are subjected to missing marking, and finally vectors entering a model are concatenated, where a concatenated vector may be (0.2, 0.1, 1, . . . , –1, . . . , 0).

The above part, offline model training, mainly includes the following steps:

S534: Divide the training sample set randomly to obtain a training set and a test set.

Division may be performed according to time windows to which the samples belong, early training samples are used as the training set (e.g., samples in May are used as the training set), and late training samples are used as a validation set (e.g., samples in June are used as the validation set); where a ratio of the training set to the validation set may be 5:1.

S536: Train a plurality of models in parallel based on preset parameters, and use a model with the best prediction effect in the plurality of models which are trained in parallel as the target object recognition model. The models used for parallel training include but are not limited to: a support vector machine (SVM), a convolutional neural network (CNN), a long short term memory (LSTM), a real-time attention based look-alike model (RALM), etc.

S538: Perform parameter optimization on the target object recognition model to improve the prediction effect of the target object recognition model. An evaluation index with the best prediction effect may be an AUC. Parameter tuning refers to grid optimization of hyper-parameters of a selected model to expect improvement of the evaluation index AUC.

S540: Obtain the target object recognition model after parameter optimization, validate the prediction effect of the target object recognition model after parameter optimization and the stability of the prediction effect on a plurality of validation sets, judge whether the prediction effect of the target object recognition model after parameter optimization reaches the standard, if yes, perform S542, and if not, perform S538.

The evaluation index for the prediction effect of the target object recognition model may be the AUC. The AUC has the following advantages: a) the index AUC itself is not related to an absolute value of a model prediction score, and only focuses on a ranking effect, so it is closer to the demands of actual business; and b) a calculation method of the AUC considers the classification capability of a learning machine for positive cases and negative cases, and can still make reasonable evaluations for a classifier under the condition of sample imbalance.

S542: Cure the target object recognition model after parameter optimization. The cured target object recognition model may be used for advertisement pushing, such as pushing of house property type advertisements or education type advertisements. The trained model is cured based on a Saver( ) method of TensorFlow (an end-to-end open-source machine learning platform), and four files are produced in total: a) a checkpoint text file, recording a path information list of model files; b) model.ckpt.data, recording network weight information; and c) model.ckpt.index.data and .index, which are binary files, saving variable weight information in models.

The model training flow of above S534 to S542 may also be cured, and offline training, validation, warning and curing are performed regularly.

More specifically, the purpose of the above part, online model calling, is to use a model which is cured offline to complete online real-time prediction, which mainly includes the followings:

S602: Obtain the target object recognition model after parameter optimization.

Specifically, S602 includes the following parts:

a) after the target object recognition model is trained offline, the trained model is cured based on the Saver( ) method of TensorFlow;

b) model files of the target object recognition model are stored at the cloud; and c) a client pulls a latest model file from the cloud based on a manner of calling a service interface.

S604: Obtain portrait features and business vertical type features of an object to be recognized.

According to feature stability, the portrait features and the business vertical type features may be divided into real-time features and offline features. The real-time features refer to features with stability lower than a threshold value, the real-time features may change with time, the real-time features mainly reflect real-time behaviors produced by an object in an application in a day, and the granularity may be an hour level, for example, a total time length of using a particular application of an object in a day. The offline features refer to features with stability higher than the threshold value, and it is less possible that the offline features change with time, such as gender of an object, a device used by an object, etc.

The computer device may perform regular calculation on data of the object to be recognized to obtain the offline features (may also be called general features), for example, basic attribute features such as gender of an object, device attribute features such as the brand of a device used by an object, and network attribute features such as the number of Wi-Fi connected with a device in a day.

The computer device may perform regular calculation on the data of the object to be recognized to obtain the offline features based on calculation engines Spark and TensorFlow and based on different feature processing rules. The feature processing rules include: One-Hot Encoding, Count Encoding, Category Embedding, NaN Embedding, Consolidation Encoding, WiFi Trajectory Embedding and App Traffic Embedding.

The computer device may also obtain real-time data of objects from real-time logs of the objects, and calculate the real-time data of the objects according to the preset feature processing rules to obtain the real-time features of the objects, such as a total time length of using a particular application of an object in a day, and the time of first starting in a day.

S606: Concatenate the portrait features and the business vertical type features of the object to be recognized.

A feature obtained after concatenating may be called a concatenated feature, which belongs to high-dimensional vectors, such as (1, 0, 2, 1.1, 41, . . . , 3, 1, 14).

S608: Input the concatenated feature to the target object recognition model to make the target object recognition model predict a probability that the object to be recognized belongs to the target object category based on the concatenated feature.

S610: Obtain the probability that the object to be recognized belongs to the target object category outputted by the target object recognition model.

S612: Determine that the object to be recognized belongs to the target object category if the probability that the object to be recognized belongs to the target object category is greater than or equal to a probability threshold value.

The target object recognition model in this disclosure example is an RALM, and evaluation of the prediction effect of the RALM by an offline experiment mainly includes:

1) mathematic index evaluation:

a) an area under curve (AUC): the larger a value of the AUC, the more possible arranging a positive sample in front of a negative sample of a current classification algorithm, and the better a classification result; and 2) online experiment evaluation:

a) the effect of the model is evaluated based on online traffic of an AB Test; and b) evaluation indexes include: an advertisement click rate, and an object real-name registration rate.

Figure 7:
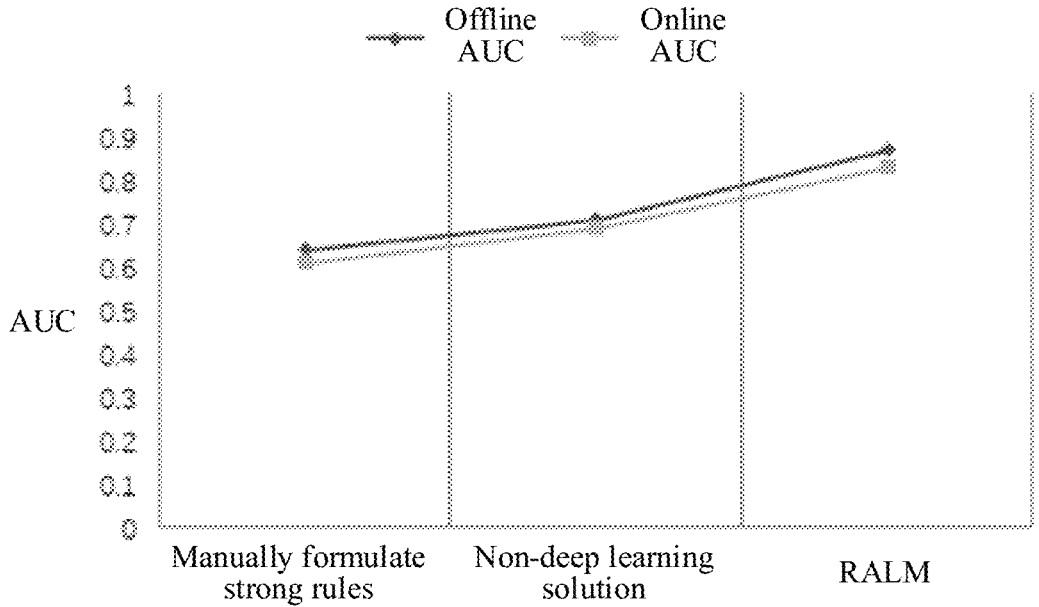
FIG. 7 is a comparison diagram of model effects of performing user house property state recognition with different models in an embodiment of this disclosure.

FIG. 7 is a comparison diagram of model effects of predicting object house property states by using different models. A model used in this example is the RALM, and it can be seen that:

a) from an offline AUC effect, it is averagely increased by 29.24% in an RALM solution compared with a solution based on manual strong rules or a non-deep-learning solution; and b) from an online AUC effect, it is averagely increased by 28.18% in the RALM solution compared with the solution based on manual strong rules or the non-deep-learning solution.

Figure 8:
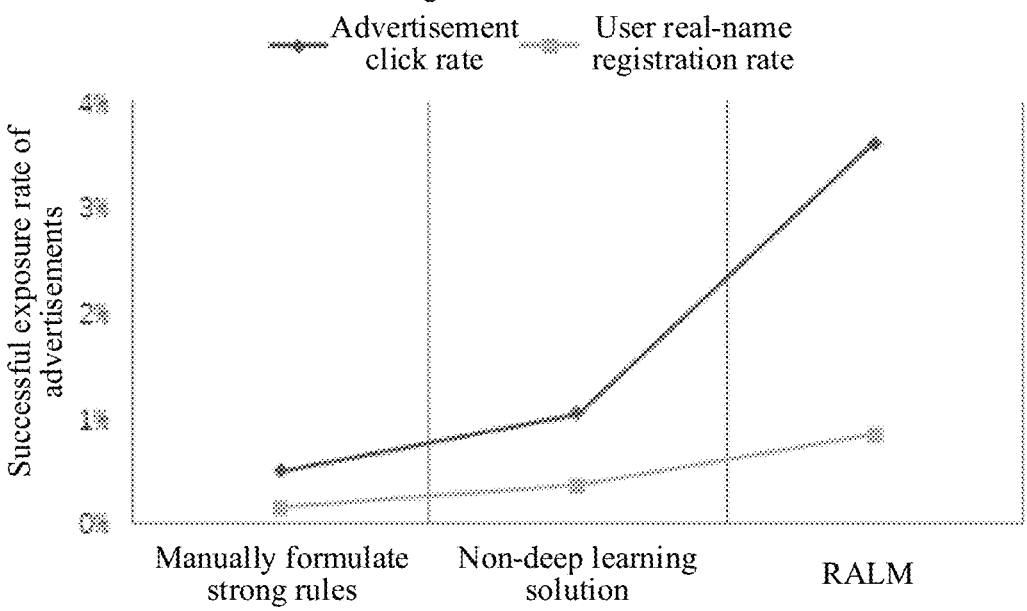
FIG. 8 is a comparison diagram of business effects of performing object house property state recognition with different models in an embodiment of this disclosure.

FIG. 8 is a comparison diagram of business effects of predicting object house property states by using different models. A model used in this example is the RALM, and it can be seen that:

a) from an advertisement click rate, it is averagely increased by 441.93% in an RALM solution compared with a solution based on manual strong rules or a non-deep-learning solution; and b) from an object real-name registration rate, it is averagely increased by 309.54% in the RALM solution compared with the solution based on manual strong rules or the non-deep-learning solution.

This example has strong reusability, object categories in corresponding scenarios can be predicted by replacing object categories to which positive samples belong without modifying other content, and processing time of the computer device is saved. Specifically, the object categories to which the positive samples belong are replaced, such as "group recognition of object car buying states", then corresponding log data are accumulated at a server side, and finally results are produced by using the same methods of feature concatenating, feature processing and model training.

It is to be understood that, although each step of the flowcharts in FIG. 2 to FIG. 6 is displayed sequentially according to arrows, the steps are not necessarily performed sequentially according to an order indicated by the arrows. Unless otherwise explicitly specified herein, execution of the steps is not strictly limited in sequence, and the steps may be performed in other sequences. Furthermore, at least some steps in FIG. 2 to FIG. 6 may include a plurality of steps or a plurality of stages. The steps or stages are not necessarily performed at the same moment, and may be performed at different moments. The steps or stages are not necessarily performed in order, but may be performed in turn or alternately with other steps or at least some of steps or stages of other steps.

Figure 9:
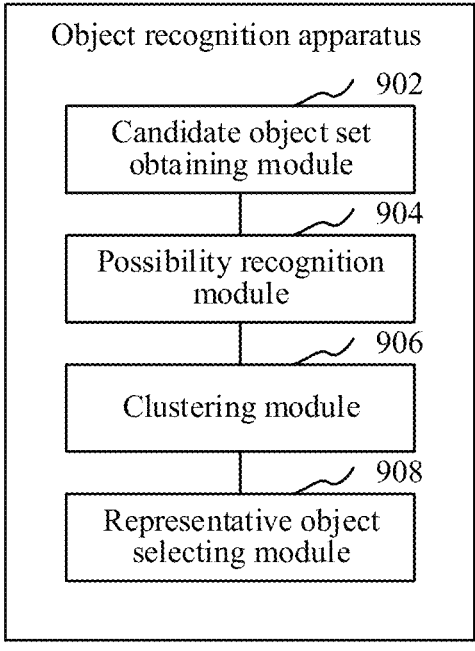
FIG. 9 is a structural block diagram of an object recognition apparatus provided by an embodiment of this disclosure.

In some embodiments, as shown in FIG. 9, an object recognition apparatus is provided and includes:

a candidate object set obtaining module 902, configured to obtain a candidate object set; the candidate object set including a plurality of candidate objects;

a probability recognition module 904, configured to obtain a plurality of pieces of candidate object information of the candidate objects on a plurality of dimensions, perform feature extraction on each piece of the candidate object information to obtain candidate object features corresponding to each piece of the candidate object information, fuse the candidate object features to obtain object extraction features corresponding to the candidate objects, and perform object category probability recognition based on the object extraction features to obtain a recognition probability that the candidate objects belong to a target object category;

a clustering module 906, configured to cluster the object extraction features corresponding to the candidate objects to obtain sub extraction feature sets corresponding to clustering categories, and constitute one sub object set from candidate objects corresponding to the object extraction features in the same sub extraction feature set; and a representative object selecting module 908, configured to obtain, for the sub object sets formed according to the sub extraction feature sets, representative objects by selecting from the sub object sets respectively based on recognition probabilities corresponding to the candidate objects in the sub object sets.

In some embodiments, the object extraction features are obtained by performing feature extraction through an object screening model. The apparatus further includes: an object screening model construction module, configured to obtain a seed object corresponding to the target object category; obtain seed object information corresponding to the seed object, and constitute a training sample with the seed object information as a training feature in the training sample and with the target object category as a label in the training sample; and perform model training based on the training sample to obtain the object screening model.

In some embodiments, the probability recognition module 904 is further configured to input the plurality of pieces of candidate object information of the candidate objects on the plurality of dimensions to a feature extraction layer of the object screening model for feature extraction, to obtain the candidate object features corresponding to each piece of the candidate object information; input the candidate object features to a classification layer of the object screening model so as to make the classification layer fuse the candidate object features to obtain the object extraction features; and obtain the recognition probability that the candidate objects belong to the target object category outputted after the classification layer performs object category probability recognition on the object extraction features.

In some embodiments, the clustering module 906 is further configured to obtain feature distances between the object extraction features corresponding to the different candidate objects; determine, for the object extraction features, a number of object extraction features located within a region where the object extraction features are located based on the feature distances, and obtain regional object densities of the object extraction features based on the number; select clustering centers based on the regional object densities of the object extraction features, and perform clustering on the object extraction features based on the clustering centers to obtain the sub extraction feature sets corresponding to the clustering categories; and constitute the one sub object set from the candidate objects corresponding to the object extraction features in the same sub extraction feature set.

In some embodiments, the clustering module 906 is further configured to determine adjacent extraction features of the object extraction features in features with regional object densities greater than the regional object densities of the object extraction features; use feature distances between the object extraction features and the adjacent extraction features as target distances corresponding to the object extraction features; and select the clustering centers based on the regional object densities of the object extraction features and the target distances corresponding to the object extraction features.

In some embodiments, the clustering module 906 is further configured to determine object extraction features with minimum feature distances to the object extraction features in the features with the regional object densities greater than the regional object densities of the object extraction features; and use the object extraction features with the minimum feature distances to the object extraction features as the adjacent extraction features of the object extraction features.

In some embodiments, the clustering module 906 is further configured to obtain a current object extraction feature whose clustering category is to be determined; obtain clustering centers with regional object densities greater than a regional object density of the current object extraction feature as candidate clustering centers corresponding to the current object extraction feature; constitute a candidate center set from the candidate clustering centers corresponding to the current object extraction feature; and select an adjacent clustering center corresponding to the current object extraction feature from the candidate center set based on distances between the current object extraction feature and the candidate clustering centers, and add the current object extraction feature into the sub extraction feature set corresponding to the adjacent clustering center.

In some embodiments, the clustering module 906 is further configured to determine a clustering center with a minimum feature distance to the current object extraction feature in the candidate center set; and use the clustering center with the minimum feature distance to the current object extraction feature as the adjacent clustering center corresponding to the current object extraction feature.

In some embodiments, the apparatus further includes a region determining module, which is configured to obtain, when one of the objects is used as a target object, feature distances between object extraction features of other objects and an object extraction feature of the target object; and determine, when a feature distance corresponding to one of the other objects is less than a preset radius, that the object extraction feature of the one of the other objects is located within a region where the object extraction feature of the target object is located.

In some embodiments, the representative object selecting module 908 is further configured to obtain, for the sub object sets formed according to the sub extraction feature sets, candidate objects with a recognition probability meeting a first preset condition respectively from the sub object sets as the corresponding representative objects in the sub object sets. The first preset condition includes at least one of: a recognition probability being greater than a probability threshold value, or a probability rank being before a first ranking threshold value.

In some embodiments, the apparatus further includes a second set processing module, which is configured to determine an influence weight of the candidate objects for a training gradient change of the target object recognition model based on the recognition probability that the candidate objects belong to the target object category, the influence weight for the training gradient change having a positive correlation relationship with the recognition probability; and select candidate objects meeting a second preset condition from the candidate object set based on the influence weight of the candidate objects for the training gradient change of the target object recognition model, and add the candidate objects meeting the second preset condition into a training sample set. The second preset condition includes at least one of: the influence weight for the training gradient change being greater than an influence weight threshold value, or an influence weight rank being before a second ranking threshold value.

In some embodiments, the object category recognition probability is performed through the target object recognition model, and the apparatus further includes a target object recognition model constructing module, which is configured to select a first training object and a second training object which are similar from the training sample set, and constitute an object group from the first training object and the second training object; input training object information corresponding to the training objects in the object group to the same feature extraction layer, and obtain training object features corresponding to the training objects respectively by extraction; obtain an object similarity between the training objects in the object group based on the training object features; obtain a model loss value based on the object similarity; the model loss value having a negative correlation relationship with the object similarity; and train an object recognition model based on the model loss value to obtain the target object recognition model.

In some embodiments, the apparatus further includes an object information processing module, which is configured to obtain object information categories; obtain a corresponding time dimension set and information statistics angle of the training objects in the object information categories, the time dimension set including a plurality of information statistics time dimensions; obtain object information statistical values corresponding to the training objects obtained by statistics based on the information statistics angle in information statistics time dimensions; the object information statistical values being information statistical values corresponding to the object information categories; and perform information aggregation on the object information statistical values corresponding to the information statistics time dimensions in the time dimension set, and use object information obtained by aggregation as the training object information corresponding to the training objects.

In some embodiments, the object information processing module is further configured to obtain a comprehensive information statistical value based on the object information statistical values corresponding to the information statistics time dimensions in the time dimension set; determine statistical value differences between the object information statistical values and the comprehensive information statistical value; and obtain a statistical value discrete degree corresponding to the time dimension set based on the statistical value differences, and use the statistical value discrete degree as the training object information corresponding to the training objects. The statistical value discrete degree has a positive correlation relationship with the statistical value differences.

In the above object recognition apparatus, the object extraction features are obtained by performing feature extraction on the candidate object information, and since the candidate objects are clustered according to the object extraction features of the candidate objects, objects belonging to the same category may be placed in the same sub object set. As the recognition probability that the candidate objects belong to the target object category is obtained according to the object extraction features of the candidate objects, the representative objects are obtained by selecting from the sub object sets respectively according to the recognition probability of the candidate objects, the objects having representativeness may be selected from the sub object sets belonging to the same category, the accuracy of object recognition is improved, the effectiveness of information transfer is improved, pushing massive information to mismatched objects is avoided, and computer resources are saved.

Specific restrictions about the object recognition apparatus may refer to the restrictions for the object recognition method above. Each module in the above object recognition apparatus may be implemented entirely or partially through software, hardware, or a combination thereof. The modules above may be embedded into or independent of a processor in a computer device in a hardware form, or may be stored in a memory in the computer device in a software form, to facilitate calling of the processor to execute operations corresponding to the modules above.

Figure 10:
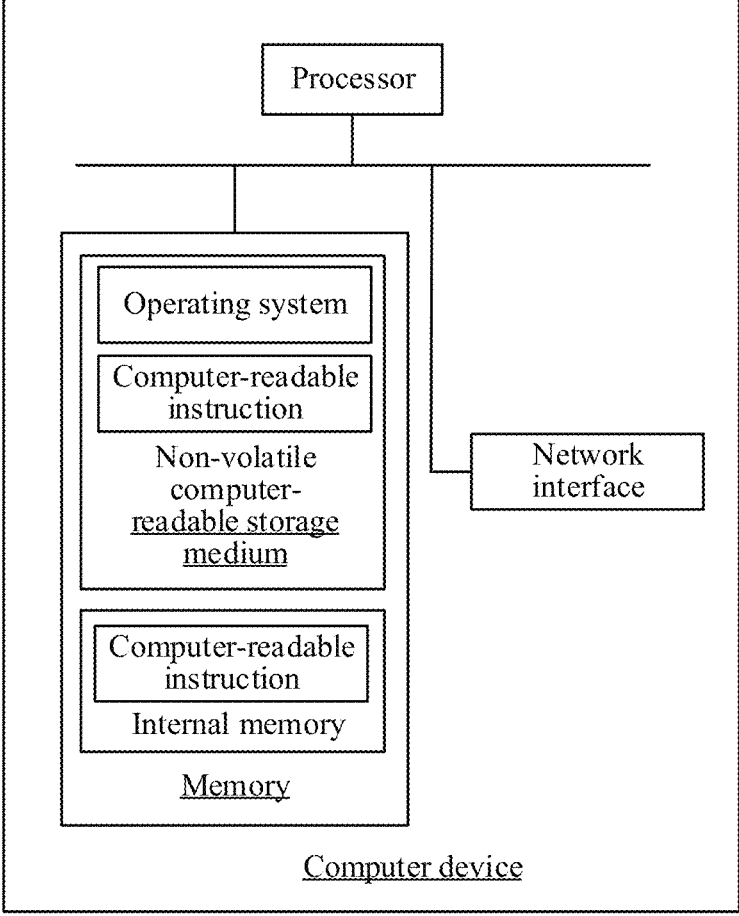
FIG. 10 is an internal structural diagram of a computer device provided by an embodiment of this disclosure.

In some embodiments, a computer device is provided, the computer device may be a server, and a diagram of an internal structure thereof may be as shown in FIG. 10. The computer device includes at least one processor and a memory that are connected by using a system bus or any other coupling method. The computer device may also include a network interface. The processor of the computer device is configured to provide computation and control ability. The memory of the computer device includes a non-volatile storage medium and an internal memory. The non-volatile storage medium stores an operating system, computer-readable instructions and databases. The internal memory provides an environment for running of the operating system and the computer-readable instructions in the non-volatile storage medium. The databases of the computer device are configured to store object recognition data. The network interface of the computer device is configured to connect to and communicate with an external terminal by using a network. The computer-readable instructions are executed by the processor to implement an object recognition method.

A person skilled in the art may understand that, the structure shown in FIG. 10 is merely a block diagram of a partial structure related to a solution in this disclosure, and does not constitute a limitation to the computer device to which the solution in this disclosure is applied. Specifically, the computer device may include more components or fewer components than those shown in the figure, or some components may be combined, or a different component deployment may be used.

In some embodiments, a computer device is provided, including: a memory and at least one processor, the memory storing computer-readable instructions, and the computer-readable instructions, when executed by the processor, causing the processor to implement the method in this embodiment of this disclosure.

In some embodiments, a non-transitory computer-readable storage medium is provided, the computer-readable storage medium storing computer-readable instructions, and the computer-readable instructions, when executed by at least one processor, causing the processor to implement the method in this embodiment of this disclosure.

In some embodiments, a computer program product is provided, including computer-readable instructions, the computer-readable instructions being stored in a computer-readable storage medium; and a processor of a computer device reading the computer-readable instructions from the computer-readable storage medium, and the processor executing the computer-readable instructions to cause the computer device to execute the method in this embodiment of this disclosure.

A person of ordinary skill in the art may understand that all or some of procedures of the method in the foregoing embodiments may be completed by computer-readable instructions instructing relevant hardware. The above computer-readable instructions may be stored in a non-transitory computer-readable storage medium. The computer-readable instructions, when executed, may include the procedures of the foregoing method embodiments. Any reference to the memory, the storage, the database, or other media used in all the embodiments provided in this disclosure may all include at least one of a non-volatile or a volatile memory. The non-volatile memory may include a read-only memory (ROM), magnetic tape, a floppy disc, a flash memory or an optical storage. The volatile memory may include a random access memory (RAM) or an external cache memory. As an explanation rather than limitation, the RAM may take various forms, such as a static random access memory (SRAM) or a dynamic random access memory (DRAM).

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this disclosure specifically and in detail, but cannot be construed as a limitation to the patent scope of this disclosure. It is to be understood that for a person of ordinary skill in the art, several transformations and improvements can be made without departing from the concept of this disclosure. These transformations and improvements are within the protection scope of this disclosure. Therefore, the protection scope of the patent of this disclosure shall be subject to the appended claims.

What is claimed is:

1. A method, comprising:

obtaining a candidate object set having a plurality of candidate objects;

obtaining a plurality of pieces of candidate object information of the candidate objects on a plurality of dimensions, performing feature extraction on each piece of the candidate object information to obtain candidate object features corresponding to each piece of the candidate object information, fusing the candidate object features to obtain object extraction features corresponding to the candidate objects through an object screening model, and performing object category probability recognition based on the object extraction features to obtain a recognition probability that the candidate objects belong to a target object category;

clustering the object extraction features corresponding to the candidate objects to obtain sub extraction feature sets corresponding to clustering categories, and forming one sub object set from candidate objects corresponding to the object extraction features in the same sub extraction feature set; and obtaining, for the sub object sets formed according to the sub extraction feature sets, representative objects by selecting from the sub object sets respectively based on recognition probabilities corresponding to the candidate objects in the sub object sets, wherein the object screening model is determined by:

obtaining a seed object corresponding to the target object category;

obtaining seed object information corresponding to the seed object, and forming a training sample with the seed object information as a training feature in the training sample and with the target object category as a label in the training sample; and performing model training based on the training sample to obtain the object screening model.

2. The method according to claim 1, wherein:

the obtaining a plurality of pieces of candidate object information of the candidate objects on a plurality of dimensions, and performing feature extraction on each piece of the candidate object information to obtain candidate object features corresponding to each piece of the candidate object information further comprises:

inputting the plurality of pieces of candidate object information of the candidate objects on the plurality of dimensions to a feature extraction layer of the object screening model for feature extraction, to obtain the candidate object features corresponding to each piece of the candidate object information; and the fusing the candidate object features to obtain object extraction features corresponding to the candidate objects, and performing object category probability recognition based on the object extraction features to obtain a recognition probability that the candidate objects belong to a target object category further comprises:

inputting the candidate object features to a classification layer of the object screening model so as to make the classification layer fuse the candidate object features to obtain the object extraction features; and obtaining the recognition probability that the candidate objects belong to the target object category outputted after the classification layer performs object category probability recognition on the object extraction features.

3. The method according to claim 1, wherein the clustering the object extraction features corresponding to the candidate objects to obtain sub extraction feature sets corresponding to clustering categories, and forming one sub object set from candidate objects corresponding to the object extraction features in the same sub extraction feature set further comprises:

obtaining feature distances between the object extraction features corresponding to the different candidate objects;

determining, for the object extraction features, a number of object extraction features located within a region where the object extraction features are located based on the feature distances, and obtaining regional object densities of the object extraction features based on the number;

selecting clustering centers based on the regional object densities of the object extraction features, and performing clustering on the object extraction features based on the clustering centers to obtain the sub extraction feature sets corresponding to the clustering categories; and forming the one sub object set from the candidate objects corresponding to the object extraction features in the same sub extraction feature set.

4. The method according to claim 3, wherein the selecting clustering centers based on the regional object densities of the object extraction features further comprises:

determining adjacent extraction features of the object extraction features in features with regional object densities greater than the regional object densities of the object extraction features;

using feature distances between the object extraction features and the adjacent extraction features as target distances corresponding to the object extraction features; and selecting the clustering centers based on the regional object densities of the object extraction features and the target distances corresponding to the object extraction features.

5. The method according to claim 4, wherein the determining adjacent extraction features of the object extraction features in features with regional object densities greater than the regional object densities of the object extraction features further comprises:

determining object extraction features with minimum feature distances to the object extraction features in the features with the regional object densities greater than the regional object densities of the object extraction features; and using the object extraction features with the minimum feature distances to the object extraction features as the adjacent extraction features of the object extraction features.

6. The method according to claim 3, wherein the performing clustering on the object extraction features based on the clustering centers to obtain the sub extraction feature sets corresponding to the clustering categories further comprises:

obtaining a current object extraction feature whose clustering category is to be determined;

obtaining clustering centers with regional object densities greater than a regional object density of the current object extraction feature as candidate clustering centers corresponding to the current object extraction feature; forming a candidate center set from the candidate clustering centers corresponding to the current object extraction feature; and selecting an adjacent clustering center corresponding to the current object extraction feature from the candidate center set based on distances between the current object extraction feature and the candidate clustering centers, and adding the current object extraction feature into the sub extraction feature set corresponding to the adjacent clustering center.

7. The method according to claim 6, wherein the selecting an adjacent clustering center corresponding to the current object extraction feature from the candidate center set further comprises:

determining a clustering center with a minimum feature distance to the current object extraction feature in the candidate center set; and using the clustering center with the minimum feature distance to the current object extraction feature as the adjacent clustering center corresponding to the current object extraction feature.

8. The method according to claim 3, wherein determining the object extraction features located within the region where the object extraction features are located further comprises:

obtaining a feature distance between any of the object extraction features and any other object extraction feature; and determining that the other object extraction feature is located within the region where the object extraction features are located in a case that the feature distance is less than a preset radius.

9. The method according to claim 1, wherein the obtaining, for the sub object sets formed according to the sub extraction feature sets, representative objects by selecting from the sub object sets respectively based on recognition probabilities corresponding to the candidate objects in the sub object sets further comprises:

obtaining, for the sub object sets formed according to the sub extraction feature sets, candidate objects with a recognition probability meeting a first preset condition respectively from the sub object sets as the corresponding representative objects in the sub object sets, wherein the first preset condition includes at least one of: a recognition probability being greater than a probability threshold value, and a probability rank being before a first ranking threshold value.

10. The method according to claim 1, wherein the candidate object information of the representative objects are used in training a target object recognition model configured to recognize whether objects belong to the target object category, and the method further comprises:

determining an influence weight of the candidate objects for a training gradient change of the target object recognition model based on the recognition probability that the candidate objects belong to the target object category, the influence weight for the training gradient change having a positive correlation relationship with the recognition probability; and selecting candidate objects meeting a second preset condition from the candidate object set based on the influence weight of the candidate objects for the training gradient change of the target object recognition model, and adding the candidate objects meeting the second preset condition into a training sample set, wherein the second preset condition includes at least one of: the influence weight for the training gradient change being greater than an influence weight threshold value, and an influence weight rank for the training gradient change being before a second ranking threshold value.

11. The method according to claim 1, wherein the candidate object information of the representative objects are used in training a target object recognition model configured to recognize whether objects belong to the target object category, and the target object recognition model is trained by:

adding the selected representative objects into the training sample set of the target object recognition model;

performing model training on the target object recognition model according to the training sample set of the target object recognition model; and predicting whether objects belong to the target object category through the trained target object recognition model.

12. The method according to claim 11, wherein the performing model training on the target object recognition model according to the training sample set of the target object recognition model comprises:

selecting a first training object and a second training object which are similar from the training sample set, and forming an object group from the first training object and the second training object;

inputting training object information corresponding to the training objects in the object group to the same feature extraction layer, and obtaining training object features corresponding to the training objects respectively by extraction;

obtaining an object similarity between the training objects in the object group based on the training object features;

obtaining a model loss value based on the object similarity; the model loss value having a negative correlation relationship with the object similarity; and training an object recognition model based on the model loss value to obtain the target object recognition model.

13. The method according to claim 12, wherein the training object information corresponding to the training objects is obtained by:

obtaining object information categories;

obtaining a corresponding time dimension set and information statistics angle of the training objects in the object information categories, the time dimension set comprising a plurality of information statistics time dimensions;

obtaining object information statistical values corresponding to the training objects obtained by statistics based on the information statistics angle in the information statistics time dimensions; the object information statistical values being information statistical values corresponding to the object information categories; and performing information aggregation on the object information statistical values corresponding to the information statistics time dimensions in the time dimension set, and using object information obtained by aggregation as the training object information corresponding to the training objects.

14. The method according to claim 13, wherein the performing information aggregation on the object information statistical values corresponding to the information statistics time dimensions in the time dimension set, and using object information obtained by aggregation as the training object information corresponding to the training objects further comprises:

obtaining a comprehensive information statistical value based on the object information statistical values corresponding to the information statistics time dimensions in the time dimension set;

determining statistical value differences between the object information statistical values and the comprehensive information statistical value; and obtaining a statistical value discrete degree corresponding to the time dimension set based on the statistical value differences, and using the statistical value discrete degree as the training object information corresponding to the training objects; the statistical value discrete degree having a positive correlation relationship with the statistical value differences.

15. A computer device, comprising:

a memory being configured to store computer-readable instructions; and at least one processor coupled to the memory configured to execute the computer-readable instructions to perform:

obtaining a candidate object set having a plurality of candidate objects;

obtaining a plurality of pieces of candidate object information of the candidate objects on a plurality of dimensions, performing feature extraction on each piece of the candidate object information to obtain candidate object features corresponding to each piece of the candidate object information, fusing the candidate object features to obtain object extraction features corresponding to the candidate objects, and performing object category probability recognition based on the object extraction features to obtain a recognition probability that the candidate objects belong to a target object category;

clustering the object extraction features corresponding to the candidate objects to obtain sub extraction feature sets corresponding to clustering categories, and forming one sub object set from candidate objects corresponding to the object extraction features in the same sub extraction feature set; and obtaining, for the sub object sets formed according to the sub extraction feature sets, representative objects by selecting from the sub object sets respectively based on recognition probabilities corresponding to the candidate objects in the sub object sets, wherein the object screening model is determined by:

obtaining a seed object corresponding to the target object category;

obtaining seed object information corresponding to the seed object, and forming a training sample with the seed object information as a training feature in the training sample and with the target object category as a label in the training sample; and performing model training based on the training sample to obtain the object screening model.

16. The computer device according to claim 15, wherein:

the obtaining a plurality of pieces of candidate object information of the candidate objects on a plurality of dimensions, and performing feature extraction on each piece of the candidate object information to obtain candidate object features corresponding to each piece of the candidate object information further comprises:

inputting the plurality of pieces of candidate object information of the candidate objects on the plurality of dimensions to a feature extraction layer of the object screening model for feature extraction, to obtain the candidate object features corresponding to each piece of the candidate object information; and the fusing the candidate object features to obtain object extraction features corresponding to the candidate objects, and performing object category probability recognition based on the object extraction features to obtain a recognition probability that the candidate objects belong to a target object category further comprises:

inputting the candidate object features to a classification layer of the object screening model so as to make the classification layer fuse the candidate object features to obtain the object extraction features; and obtaining the recognition probability that the candidate objects belong to the target object category outputted after the classification layer performs object category probability recognition on the object extraction features.

17. A non-transitory computer-readable storage medium storing computer-readable instructions executable by at least one processor to perform:

obtaining a candidate object set having a plurality of candidate objects;

obtaining a plurality of pieces of candidate object information of the candidate objects on a plurality of dimensions, performing feature extraction on each piece of the candidate object information to obtain candidate object features corresponding to each piece of the candidate object information, fusing the candidate object features to obtain object extraction features corresponding to the candidate objects, and performing object category probability recognition based on the object extraction features to obtain a recognition probability that the candidate objects belong to a target object category;

clustering the object extraction features corresponding to the candidate objects to obtain sub extraction feature sets corresponding to clustering categories, and forming one sub object set from candidate objects corresponding to the object extraction features in the same sub extraction feature set; and obtaining, for the sub object sets formed according to the sub extraction feature sets, representative objects by selecting from the sub object sets respectively based on recognition probabilities corresponding to the candidate objects in the sub object sets, wherein the object screening model is determined by:

obtaining a seed object corresponding to the target object category;

obtaining seed object information corresponding to the seed object, and forming a training sample with the seed object information as a training feature in the training sample and with the target object category as a label in the training sample; and performing model training based on the training sample to obtain the object screening model.

18. The storage medium according to claim 17, wherein:

the obtaining a plurality of pieces of candidate object information of the candidate objects on a plurality of dimensions, and performing feature extraction on each piece of the candidate object information to obtain candidate object features corresponding to each piece of the candidate object information further comprises:

inputting the plurality of pieces of candidate object information of the candidate objects on the plurality of dimensions to a feature extraction layer of the object screening model for feature extraction, to obtain the candidate object features corresponding to each piece of the candidate object information; and the fusing the candidate object features to obtain object extraction features corresponding to the candidate objects, and performing object category probability recognition based on the object extraction features to obtain a recognition probability that the candidate objects belong to a target object category further comprises:

inputting the candidate object features to a classification layer of the object screening model so as to make the classification layer fuse the candidate object features to obtain the object extraction features; and obtaining the recognition probability that the candidate objects belong to the target object category outputted after the classification layer performs object category probability recognition on the object extraction features.

19. The storage medium according to claim 17, wherein the clustering the object extraction features corresponding to the candidate objects to obtain sub extraction feature sets corresponding to clustering categories, and forming one sub object set from candidate objects corresponding to the object extraction features in the same sub extraction feature set further comprises:

obtaining feature distances between the object extraction features corresponding to the different candidate objects;

determining, for the object extraction features, a number of object extraction features located within a region where the object extraction features are located based on the feature distances, and obtaining regional object densities of the object extraction features based on the number;

selecting clustering centers based on the regional object densities of the object extraction features, and performing clustering on the object extraction features based on the clustering centers to obtain the sub extraction feature sets corresponding to the clustering categories; and forming the one sub object set from the candidate objects corresponding to the object extraction features in the same sub extraction feature set.

20. The storage medium according to claim 19, wherein the selecting clustering centers based on the regional object densities of the object extraction features further comprises:

determining adjacent extraction features of the object extraction features in features with regional object densities greater than the regional object densities of the object extraction features;

using feature distances between the object extraction features and the adjacent extraction features as target distances corresponding to the object extraction features; and selecting the clustering centers based on the regional object densities of the object extraction features and the target distances corresponding to the object extraction features.

* * * * *